US005497203A

United States Patent [19]
Kayashima et al.

[11] Patent Number: 5,497,203
[45] Date of Patent: Mar. 5, 1996

[54] MOTION DETECTION CIRCUIT FOR HIGH DEFINITION TELEVISION BASED ON MUSE

[75] Inventors: Hiroshi Kayashima; Jun Ido; Naoki Hayashi; Kenji Urasaki; Akio Sasai, all of Kyoto, Japan

[73] Assignee: Mitsubishi Denki Kabushiki Kaisha, Tokyo, Japan

[21] Appl. No.: 968,532

[22] Filed: Oct. 29, 1992

[30] Foreign Application Priority Data

| Oct. 30, 1991 | [JP] | Japan | 3-283419 |
| Apr. 1, 1992 | [JP] | Japan | 4-079565 |
| May 22, 1992 | [JP] | Japan | 4-130580 |
| May 22, 1992 | [JP] | Japan | 5-130582 |

[51] Int. Cl.$^6$ .............................. H04N 7/01; H04N 11/20
[52] U.S. Cl. ............................. 348/699; 348/451
[58] Field of Search ............................. 358/105, 136, 358/138, 12; 348/392, 398, 413, 451, 452, 699; H04N 7/12, 11/20, 7/01

[56] References Cited

U.S. PATENT DOCUMENTS

| 4,692,801 | 9/1987 | Ninomiya et al. | 358/136 |
| 4,884,136 | 11/1989 | Ninomiya et al. | 358/136 |
| 4,953,032 | 8/1990 | Suzaki et al. | 358/105 |
| 4,982,288 | 1/1991 | Isobe et al. | 348/452 |
| 4,984,077 | 1/1991 | Uchida | 348/392 |
| 5,018,010 | 5/1991 | Masumoto | 358/136 |

FOREIGN PATENT DOCUMENTS

0204450  12/1986  European Pat. Off. .

(List continued on next page.)

OTHER PUBLICATIONS

IEEE 1989 International Conference on Consumer Electronics–6 Jun. 1989, Rosemont (US), pp. 196–197, XP76026, A. Ishizu, et al., "Digital Signal Processing for Improved NTS Television Receiver".
IEE Transactions on Consumer Electronics, vol. 36, No. 3, Aug. 1990, New York US, pp. 198–205, XP162839, Y. Seki, et al. "Video Signal Procesing for HDTV Receiver".
Signal processing of HDTV, II. Proceedings of the Third Workshop on HDTV, 30 Aug. 1989, Turin (IT) pp. 125–130, XP215233, H. M. Jung, et al. "A New Motion Detection Method in the Sub–Nyquist Sampled HDTV Signals with Frame–Offset".
IEEE Transactions on Consumer Electronics, vol. 36, No. 3, Aug. 1990, New York, US, pp. 684–690, XP162907, M. Abe, et al. "LSI Family for Muse Decoder".
Article entitled, "A Study of Motion Detector for Muse Decoder" from Muse–Hivision Transmission Method, The Institute of Electronics Information and Communication Engineers (IEICE).
"NHK Proposes High–Definition TV Using Muse Bandwidth Compression," Ninomiya et al., Journal of Electronic Engineering, vol. 22, No. 219, Mar. 1985, pp. 40–44.
Patent Abstracts of Japan, vol. 17, No. 94, Feb. 24, 1993, JP4–286,495.
Patent Abstracts of Japan, vol. 17, No. 94, Feb. 24, 1993, JP4–286,484.

*Primary Examiner*—Tommy P. Chin
*Assistant Examiner*—Vu Le

[57] ABSTRACT

A motion detection circuit within MUSE decoder for reproducing a high definition television picture signal from a MUSE signal obtains one-interframe differential signal and preferably one-interfield differential signal from an interframe interpolation signal. The differential signals are passed through a vertical filter to limit the vertical frequency and through a horizontal filter or filters to obtain a high and a low frequency component signal. The judgment circuit judges the reliability of the high and low component signals on the basis of the levels of peak values thereof, and the selector selects an appropriate signal in accordance with the judgment. Horizontal and vertical width extenders and absolute value output circuits may be provided to improve the performance. The selected differential signal is normalized by a sensitivity converter circuit in accordance with the output signal of an edge detector circuit, and then an isolated points remover circuit removes noise components from the out:put signal of the sensitivity converter circuit on the basis of horizontal and vertical correlation judgment.

43 Claims, 11 Drawing Sheets

FOREIGN PATENT DOCUMENTS

| | | | |
|---|---|---|---|
| 0263375 | 4/1988 | European Pat. Off. | H04N 7/00 |
| 0310032 | 4/1989 | European Pat. Off. | |
| 0371677 | 6/1990 | European Pat. Off. | |
| 0434290 | 6/1991 | European Pat. Off. | H04N 7/12 |
| 0460928 | 12/1991 | European Pat. Off. | H04N 7/01 |
| 4121727 | 1/1992 | Germany | H04N 9/64 |
| 0108976 | 5/1991 | Japan | H04N 7/01 |
| 2247377 | 2/1992 | United Kingdom | H04N 7/137 |

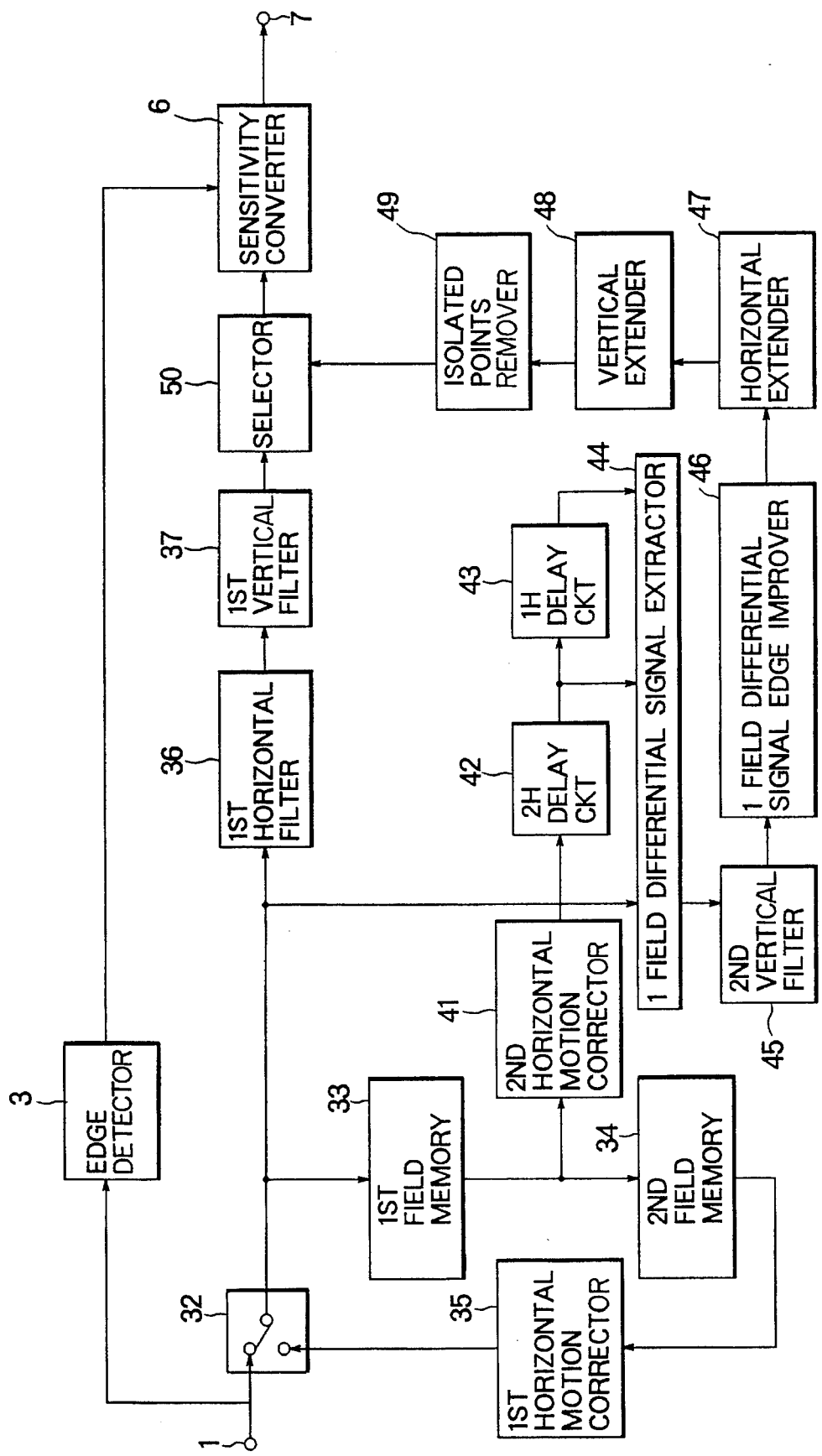

MOTION DETECTION CIRCUIT FOR HIGH DEFINITION TELEVISION BASED ON MUSE

BACKGROUND OF THE INVENTION

This invention relates to motion detection circuits for extracting the motion information in the high definition television picture signal of the image reproduction devices based on the MUSE (multiple sub-Nyquist sampling encoding) signal.

FIG. 1 is a block diagram showing the typical structure of the conventional motion detection circuit for MUSE decoder. FIG. 2 is a diagram showing the sampling pattern of the luminance signal (Y-signal) for the MUSE (multiple sub-Nyquist sampling encoding) high definition television system. The frames of the picture signal are transmitted in cycles of four fields, upon the data transmission rate of 16.2 Mbps. In FIG. 1 and 2, the sampling points of the first and the second field are represented by white and black circles, respectively. The sampling points of the third and the fourth field are represented by white and black diamonds, respectively.

To the present data input terminal 1 is input the currently transmitted data (the present data). The edge detector circuit 3 detects the edge component (i.e., the components of high horizontal or vertical frequencies) or the high level component of the signal input to the present data input terminal 1. The edge detector circuit 3 converts the information into a signal at a data transmission rate twice as high as that of the input, i.e., to 32.4 Mbps, and supplies the output to the sensitivity converter circuit 6.

To the interframe interpolation data input terminal 2 is input the interframe interpolation data which consists of the present data (currently transmitted data) and the preceding frame data (the data that has been transmitted one frame earlier), wherein the preceding frame data are interpolated between the present data, such that the data transmission rate of the interframe interpolation data supplied to the interframe interpolation data input terminal 2 is at 32.4 Mbps.

The MUSE signal includes folding disturbance component (folding noise components) in the horizontal frequency region above 4 MHz (designated by μ0) for processing the still picture image. The horizontal filter 4 obtains the one interframe differential from the signal supplied to the interframe interpolation data input terminal 2, and limits the band width of the differential data to the frequency components under μ0.

The output of the horizontal filter 4 at the same data transmission rate, 32.4 Mbps, as the input thereto, is supplied to the vertical filter 5. The MUSE signal includes folding disturbance components (folding noise components) for the moving picture image processing procedure in the vertical frequency region in the neighborhood of 1125/4 (c/h), which is designated by μ0. The vertical filter 5 removes these disturbance components.

The output signal of the vertical filter 5 at the data transmission rate 32.4 Mbps is a one interframe differential data from which the folding disturbance components are removed. The output signal of the vertical filter 5 represents the motion information of the picture. However, the sensitivity thereof at the edge or the high level components is too high.

The sensitivity converter circuit 6 thus divides the output signal of the vertical filter 5 representing the motion information by the output signal of the edge detector circuit 3 representing the information upon the edge and the high level components, and thereby normalizes the sensitivity of the output signal of the vertical filter 5. Thus the motion information data with normalized sensitivity and at the data transmission rate of 32.4 Mbps is obtained at the motion detection data output terminal 7 supplied from the sensitivity converter circuit 6.

The above conventional motion detection circuit has the disadvantage that the motion information contained in components of horizontal frequency above μ0 cannot be obtained. Further disadvantage is that the edges of the motion detection data are blurred and become unclear.

SUMMARY OF THE INVENTION

It is therefore an object of this invention to provide a motion detection circuit by which improved motion information can be obtained irrespective of the horizontal frequency.

The above object is accomplished in accordance with the principle of this invention by a motion detection circuit in MUSE decoder for reproducing a high definition television picture signal from a MUSE signal, which includes: two-dimensional filter means for obtaining one-interframe differential signal from interframe interpolation signal consisting of present field transmitted data and data transmitted one frame earlier interpolated therein, the two-dimensional filter means attenuating frequency components in a neighborhood of vertical frequency 1125/4 cycles/height(c/h) in a slant-wise direction;

horizontal filter means for separating an output signal of the two-dimensional filter into a high frequency component signal above horizontal frequency 4 MHz and a low frequency component signal below horizontal frequency 4 MHz;

first peak detector means coupled to the horizontal filter means for obtaining and outputting a peak value of the low frequency component signal below horizontal frequency 4 MHz;

horizontal width extender means, coupled to the first peak detector means and the horizontal filter means, for holding the peak value output from the first peak detector means for a tap length of the horizontal filter means, the horizontal width extender means outputting a peak value nearest to a current level of the low frequency component signal below horizontal frequency 4 MHz;

non-linear circuit means coupled to the horizontal filter means, for effecting a non-linear conversion to the low frequency component signal below horizontal frequency 4 MHz, thereby effecting an adjustment for an attenuation of high frequency components in the low frequency component signal;

first area filter means coupled to the horizontal filter means, for determining valid and invalid regions of the high frequency component signal above horizontal frequency 4 MHz, the first area filter means clipping the high frequency component signal above horizontal frequency at 4 MHz in response to a level of the low frequency component signal below horizontal frequency 4 MHz;

second peak detector means coupled to the first area filter means, for obtaining and outputting a peak value of an output signal of the first area filter means;

comparator means coupled to the horizontal filter means and the first area filter means, for comparing levels of the output signal of the first area filter means and the low frequency component signal below horizontal frequency at 4 MHz;

judgment/selector means coupled to the first peak detector means, the second peak detector means, the comparator means, the horizontal width extender means, and the non-linear circuit means, the judgment/selector means selecting one from output signals of the horizontal width extender means and the non-linear circuit means on the basis of correlation among output signals of the first peak detector means, the second peak detector means, and the comparator means;

second area filter means coupled to the two-dimensional filter means and the judgment/selector means, for selecting one from output signals of the two-dimensional filter means and the judgment/selector means in response to a level of the output signal of the two-dimensional filter means;

edge detector circuit means for extracting edge components of transmitted data of present field from a present data input signal;

sensitivity converter circuit means coupled to the edge detector circuit means and the second area filter means, for effecting non-linear conversion to an output signal of the second area filter by means of an output signal of the edge detector circuit thereby normalizing a sensitivity of the output signal of the second area filter; and isolated points remover circuit means coupled to the sensitivity converter circuit means, for removing noise components having no correlation with neighboring data from an output signal of the sensitivity converter circuit means on the basis of a horizontal and vertical correlation judgement.

According another aspect of this invention, the motion detection circuit in MUSE decoder includes:

interpolator means receiving current field transmission data, for interpolating data transmitted one frame earlier into a current field transmission data;

first field memory means coupled to the interpolator means, for delaying an output signal of the interpolator means by 560 horizontal scanning periods;

second field memory means coupled to the first field memory means, for delaying an output signal of the first field memory by 565 horizontal scanning periods, the second field memory means effecting vertical motion correction to an output signal of the first field memory in response to a vertical motion vector;

first horizontal motion corrector means coupled to the second field memory means, for effecting horizontal motion correction to an output signal of the second field memory in response to horizontal motion vector; and second horizontal motion corrector means coupled to the first field memory means, for effecting horizontal motion correction to an output signal of the first field memory in response to a horizontal motion vector.

Preferably, the motion detection circuit includes: 2-H delay circuit means coupled to the second horizontal motion corrector means, for delaying the output signal of the second horizontal motion corrector by two horizontal scanning periods; 1-H delay circuit means coupled to the 2-H delay circuit means, for delaying the output signal of the 2-H delay circuit by one horizontal scanning periods; and one-field differential extractor means coupled to the interpolator means, the 2-H delay circuit means, and the 1-H delay circuit means, the one-field differential extractor means obtaining and outputting one-interfield differential or a one-interframe sum of one-interfield differentials. It is further preferred that the motion detection circuit includes: first two-dimensional filter means coupled to the one-field differential extractor means, for attenuating frequency components of an output signal of the one-field differential extractor near vertical frequency 1125/4 (c/h) in a slantwise direction. Still preferably, the motion detection circuit includes: horizontal filter means for separating an output signal of the first two-dimensional filter into a high frequency component signal above horizontal frequency 4 MHz and a low frequency component signal below horizontal frequency 4 MHz.

Further, the motion detection circuit may include: first peak detector means coupled to the horizontal filter means for obtaining and outputting a peak value of the low frequency component signal below horizontal frequency 4 MHz; and horizontal width extender means, coupled to the first peak detector means and the second horizontal filter means, for holding the peak value output from the first peak detector means for a tap length of the second horizontal filter means, the horizontal width extender means outputting a peak value nearest to a current level of the low frequency component signal below 4 MHz; first area filter means coupled to the horizontal filter means, for determining valid and invalid regions of the high frequency component signal above horizontal frequency 4 MHz, the first area filter means clipping the high frequency component signal above horizontal frequency at 4 MHz in response to a level of the low frequency component signal below horizontal frequency 4 MHz; second peak detector means coupled to the first area filter means, for obtaining and outputting a peak value of an output signal of the first area filter means; and comparator means coupled to the horizontal filter means and the first area filter means for comparing levels of the output signal of the first area filter means and the low frequency component signal below horizontal frequency at 4 MHz.

The judgement/selection circuit means may include first means for selecting an output signal of the horizontal width extender means in response to an output signal of comparator means when an output signal of the horizontal filter is greater than an output signal of the first area filter means; second means for selecting an output signal of the horizontal filter means in response to output signals of the first peak detector means, the second peak detector means, and the comparator means, the second means selecting an output signal of the horizontal filter means when an output signal of the horizontal filter means is less than or equal to an output signal of the first area filter means and, in addition, the first peak detector and the second peak detector do not output peak detection signals simultaneously; third means for selecting an output signal of the two-dimensional filter means in response to output signals of the first peak detector means, the second peak detector means, and the comparator means, the third means selecting an output signal of the two-dimensional filter means when the low frequency component signal of the horizontal filter means is less than or equal to an output signal of the first area filter means and, in addition, the first peak detector and the second peak detector output peak detection signals simultaneously; and fourth means for producing a logical sum of output signals of the first, second, and third means thereof.

Still further the motion detection circuit may include: second area filter means coupled to the judgement/selection circuit means, wherein the second area filter means outputs an output signal of the first two-dimensional filter when an output signal of the fourth means is greater than an output signal of the first two-dimensional filter, and outputs the output signal of the fourth means when the output signal of the fourth means is less than or equal to the output signal of the first two-dimensional filter; horizontal extender means coupled to the second area filter means, for taking at least three values of output signal of the second area filter means in a horizontal direction, the horizontal extender means selecting a peak value among the three values; vertical extender means coupled to the horizontal extender means, for taking at least three values of output signal of the horizontal extender means in a vertical direction, the vertical extender means selecting a peak value among the three values; isolated points remover means coupled to the vertical extender means, for removing noise components having no correlation with neighboring data from an output signal of the vertical extender means on the basis of horizontal and vertical correlation judgement; second two-dimensional filter coupled to the interpolator means, for determining one-interframe differential and then attenuating frequency components above horizontal frequency 4 MHz and near vertical frequency 1125/4 (c/h) in a slantwise direction; selector means for selecting one from output signals of the second two-dimensional filter and the isolated points remover means; edge detector circuit means for extracting edge components of transmitted data of present field from a present data input signal; and sensitivity converter circuit means coupled to the edge detector circuit means and the selector means, for effecting non-linear conversion to an output signal of the selector by means of an output signal of the edge detector circuit thereby normalizing a sensitivity of the output signal of the selector means.

According to a third aspect of this invention, the motion detection circuit includes:

one-interframe differential calculator means coupled to an input terminal receiving an interframe interpolation signal consisting of present transmitted data and data transmitted one frame earlier interpolated therein, the one-interframe differential calculator means calculating one-interframe differential signal from the interframe interpolation signal;

horizontal filter means coupled to the one-interframe differential calculator means, for extracting a low frequency component signal of the one-interframe differential signal output from the one-interframe differential calculator means;

two-value signal generator means coupled to the one-interframe differential calculator means, for converting the one-interframe differential signal into a two-value signal on the basis of a predetermined threshold level;

frame memory means coupled to the two-value signal generator means, for delaying the two-value signal by one frame;

switcher circuit means having an input receiving two-interframe differential signal obtained by subtracting a signal transmitted two frames earlier from a present transmitted signal, the switcher circuit means having another input terminal coupled to an output of the frame memory means, the switcher circuit means limiting two-dimensional picture region of the two-interframe differential signal by means of an output signal of the frame memory means;

wherein the motion detection circuit provides motion detection information contained in the low frequency component signal output from the horizontal filter means and a two-interframe differential signal output from the switcher circuit means.

The motion detection circuit according to the third aspect may further include: horizontal width extender means inserted between the two-value signal generator means and the frame memory means, for extending the two-value signal output from the two-value signal generator means in a horizontal direction; inverter means coupled to an output of the horizontal width extender means, for inverting a polarity of an output signal of the horizontal width extender, wherein the switcher circuit means is coupled to an output of the inverter means, the switcher circuit means limiting two-dimensional picture region of the two-interframe differential-signal by means of an output signal of the inverter means; and an OR gate means having inputs coupled to the frame memory means and the inverter means, for generating a logical sum of output signals of the frame memory means and the inverter means, wherein an output of the OR gate means is coupled to the switcher circuit means, and the switcher circuit means limits two-dimensional picture region of the two-interframe differential signal in response to an output signal of the OR gate means.

According to the fourth aspect of this invention, the motion detection circuit includes:

interpolator means having an input terminal receiving current field transmission data, for interpolating data transmitted one frame earlier into a current field transmission;

interframe differential signal extractor means coupled to the interpolator means, for extracting one-interframe differential signal from an output signal of the interpolator means;

interfield differential signal extractor means coupled to the interpolator means, for extracting one-interfield differential signal from an output signal of the interpolator means;

first two-dimensional filter means coupled to the interframe differential signal extractor means, for attenuating frequency components of the one-interframe differential signal near vertical frequency 1125/4 (c/h) in a slantwise direction;

second two-dimensional filter means coupled to the interfield differential signal extractor means, for attenuating frequency components of the one-interfield differential signal near vertical frequency 1125/4 (c/h) in a slantwise direction;

first horizontal filter means coupled to the first two-dimensional filter means, for separating an output signal of the first two-dimensional filter means into a high frequency component signal and a low frequency component signal;

second horizontal filter means coupled to the second two-dimensional filter means, for separating an output signal of the second two-dimensional filter means into a high frequency component signal and a low frequency component ;signal;

first edge improver means coupled to the first horizontal filter means, for improving edge portions of the low frequency component signal output from the first horizontal filter means;

second edge improver means coupled to the second horizontal filter means, for improving edge portions of the low frequency component signal output from the second horizontal filter means;

first folding disturbance component remover means coupled to the first horizontal filter means, for removing folding disturbance components for still picture processing from the high frequency component signal output from the first filter means;

second folding disturbance component remover means coupled to the second horizontal filter means, for removing folding disturbance components for still picture processing from the high frequency component signal output from the second filter means;

first selector means coupled to the first edge improver means and the first folding disturbance component remover means, for selecting and reproducing one-interframe differential signal;

second selector means coupled to the second edge improver means and the first folding disturbance component remover means, for selecting and reproducing one-interfield differential signal;

horizontal extender means coupled to the second selector means, for obtaining a peak value among adjacent data in horizontal direction, thereby compensating for ;motion information drop caused by subsampling in accordance with MUSE system;

vertical extender means coupled to the horizontal extender means, for obtaining a peak value among adjacent data in vertical direction, thereby compensating for motion information drop caused by subsampling in accordance with MUSE system; and third selector means coupled to the first selector means and the vertical extender means, for obtaining motion information in accordance with output signals of the first selector means and the vertical extender means.

The motion detection circuit according to the fourth aspect may further include: third horizontal filter means having an input coupled to the first two-dimensional filter means, the third horizontal filter means removing folding disturbance components of low vertical frequency near horizontal frequency 16.2 MHz; first absolute value output circuit means coupled to the first horizontal filter means, for outputting an absolute value of the low frequency component signal output from the first horizontal filter means; first subtractor means coupled to the first horizontal filter means, for subtracting an output signal of the third horizontal filter means from the low frequency component signal of the first horizontal filter means; second absolute value output circuit means coupled to the first subtractor means, for outputting an absolute value of an output signal of the first subtractor means; and first divider means coupled to the first absolute value output circuit means and the second absolute value output circuit means, for dividing an absolute value output from the second absolute value output circuit by an absolute value output from the first absolute value output circuit; wherein the first folding disturbance component remover means judges on the basis of a level of an output signal of the first divider means whether or not the one-interframe signal is within predetermined frequency range.

Further the motion detection circuit may include: a first area filter means inserted between the first edge improver means and the first selector means, the first area filter means having an input coupled to the first edge improver means, wherein the first area filter means compares an output signal of the first edge improver with a threshold level, first area filter means outputting a two-value signal corresponding to a result of comparison; a second area filter means having an input coupled to an output of the second absolute value output circuit means, wherein the second area filter means compares an output signal of the second absolute value output circuit with a threshold level, second area filter means outputting a two-value signal corresponding to a result of comparison; a third area filter means inserted between the second edge improver means and the second selector means, the third area filter means having an input coupled to the second edge improver means, wherein the third area filter means compares an output signal of the second edge improver with a threshold level, third area filter means outputting a two-value signal corresponding to a result of comparison; a fourth area filter means having an input coupled to an output of the fourth absolute value output circuit means, wherein the fourth area filter means compares an output signal of the fourth absolute value output circuit with a threshold level, fourth area filter means outputting a two-value signal corresponding to a result of comparison.

Still further, the motion detection circuit may include: fourth horizontal filter means having an input coupled to the second two-dimensional filter means, the fourth horizontal filter means removing folding disturbance components of low vertical frequency near horizontal frequency 16.2 MHz; third absolute value output circuit means coupled to the second horizontal filter means, for outputting an absolute value of the low frequency component signal output from the second horizontal filter means; second subtractor means coupled to the second horizontal filter means, for subtracting from the low frequency component signal of the second horizontal filter means an output signal of the fourth horizontal filter means; fourth absolute value output circuit means coupled to the second subtractor means, for outputting an absolute value of an output signal of the second subtractor means; second divider means coupled to the third absolute value output circuit means and the fourth absolute value output circuit means, for dividing an absolute value output from the fourth absolute value output circuit by an absolute value output from the third absolute value output circuit; wherein the second folding disturbance component remover means judges on the basis of a level of an output signal of the second divider means whether or not the one-interfield signal is within predetermined frequency range.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 6 is a block diagram showing another motion detection circuit according to this invention;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
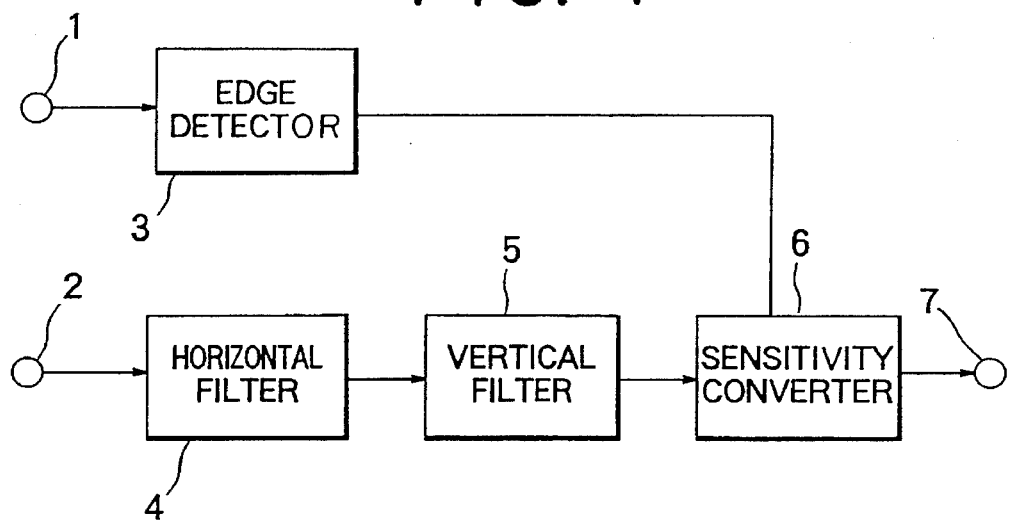
FIG. 1 is a block diagram showing the typical structure of the conventional motion detection circuit for MUSE decoder.
Figure 3:
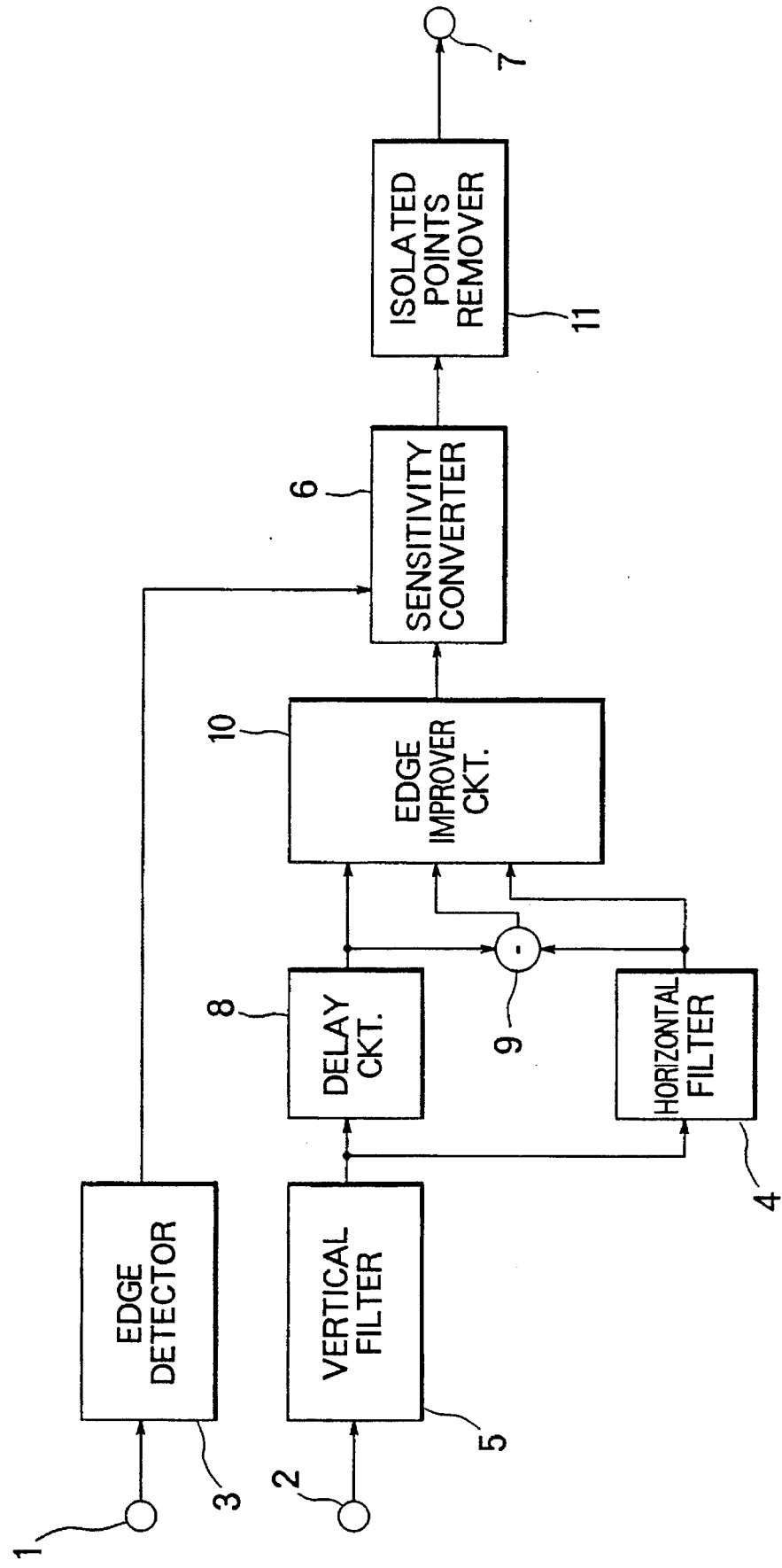
FIG. 3 is a block diagram showing the structure of a motion detection circuit according to an embodiment of this invention.

FIG. 3 is a block diagram showing the structure of a motion detection circuit according to an embodiment of this invention. The parts 1 through 3 are similar to those of FIG. 1. Thus, the edge detector circuit 3 coupled to the present data input terminal 1 supplies its output to the sensitivity converter circuit 6. Further, the vertical filter 5 coupled to the interframe interpolation data input terminal 2 supplies its output to the horizontal filter 4 and the delay circuit 8. A subtractor 9 receives outputs from the horizontal filter 4 and the delay circuit 8 and calculates the difference therebetween. An edge improver circuit 10 receives outputs from the horizontal filter 4, the delay circuit 8 and the subtractor 9, and supplies its output to the sensitivity converter circuit 6. The isolated points remover circuit 11 receives the output from the sensitivity converter circuit 6 and supplies its output to the motion detection data output terminal 7.

Next, the operation of the circuit of FIG. 3 is described. The same signals are supplied to the present data input terminal 1 and the interframe interpolation data input terminal 2, respectively, as in FIG. 1, and the method of operation of the edge detector circuit 3 is similar to that of FIG. 1. The vertical filter 5 obtains the one interframe differential from the interframe interpolation data at 32.4 Mbps received at the interframe interpolation data input terminal 2, and then removes the folding disturbance components near the vertical frequency v0 therefrom.

The output signal at 32.4 Mbps from the vertical filter 5 is input to the delay circuit 8 and the horizontal filter 4. The horizontal filter 4 limits the frequency of the input signal under the horizontal frequency μ0. The delay circuit 8 imparts the same delay to the input signal as the horizontal filter 4. The subtractor 9 calculates the difference between the horizontal filter 4 and the delay circuit 8. The edge improver circuit 10 improves the edge of the output signal of the horizontal filter 4 on the basis of the outputs of the delay circuit 8 and the subtractor 9.

Figure 4:
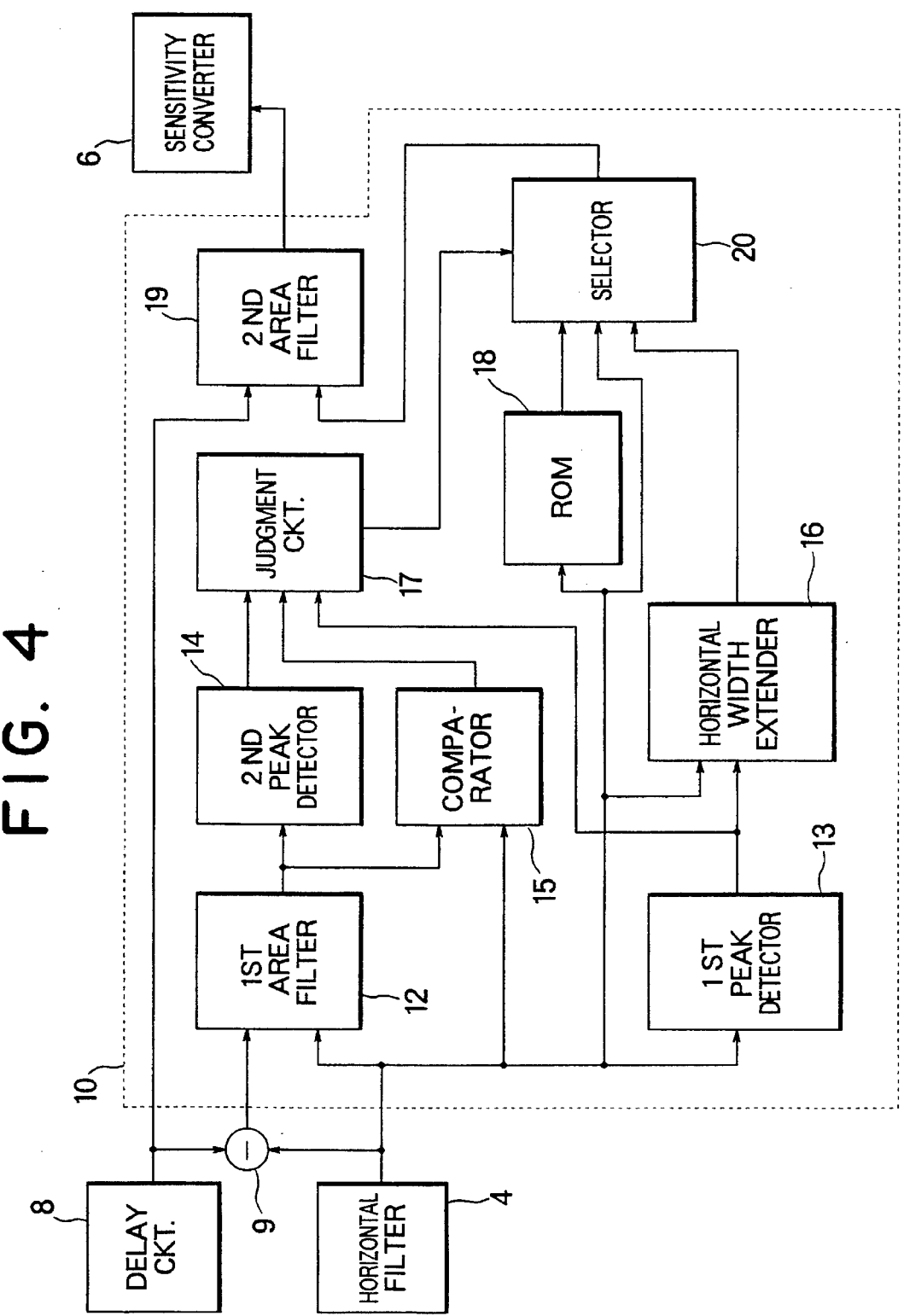
FIG. 4 shows the details of the edge improver circuit of FIG. 3.

FIG. 4 shows the details of the edge improver circuit of FIG. 3. The output signal of the subtractor 9 is the difference between the outputs of the delay circuit 8 and the horizontal filter 4, which thus represents the one interframe differential data consisting of components above horizontal frequency μ0. This signal contains folding disturbance components for the still picture processing. A first area filter 12 determines the valid and invalid regions of the output signal of the subtractor 9 on the basis of the output of the horizontal filter 4. Namely, in the regions where the output of the horizontal filter 4 is in the neighborhood of 0 (zero), the first area filter 12 judges that the output of the subtractor 9 is invalid and clips the output signal of the subtractor 9 to 0 (zero) even when the output signal of the subtractor 9 is in a significant region. Then, the output signal of the first area filter 12 vanishes. Otherwise, the output signal of the first area filter 12 is equal to the output signal of the subtractor 9.

A first peak detector 13 detects maximal or peak values of the output signal of the horizontal filter 4 by comparing the neighboring data values of the output signal of the horizontal filter 4, and outputs pulses corresponding thereto to a horizontal width extender 16 and a judgment circuit 17.

The horizontal width extender 16 holds all the peak value detection pulses supplied from the first peak detector 13 during the filter tap length of the horizontal filter 4, and, on the basis of the detection pulses thus held therein, selects and outputs the peak value nearest to the current output signal of the horizontal filter 4. A ROM circuit 18 effects non-linear conversion to the output signal of the horizontal filter 4 and thereby effects adjustments for the attenuation of the high frequency components.

A second peak detector 14 detects the peak values of the first area filter 12 by comparing the neighboring data values of the output signal of the first area filter 12. The second peak detector 14 outputs detection pulses corresponding to the detected peaks. A comparator 15 compares the levels of the outputs of the horizontal filter 4 and the second peak detector 14, outputs high and low level signals indicating the result of comparison. The output signals from the second peak detector 14 and the comparator 15 are supplied to the judgment circuit 17.

On the basis of the outputs of the first peak detector 13, the second peak detector 14, and the comparator 15, the judgment circuit 17 determines which signal is to be selected from among the outputs of the horizontal filter 4, the horizontal width extender 16 and the ROM circuit 18, and outputs the selection signal indicating the result of selection to the selector 20. Next, the method of judgment of the judgment circuit 17 is described.

(1) The case where the output of the comparator 15 indicates that (the output of the horizontal filter 4)>(the output of the second peak detector 14):

In this region, it can be judged that the output of the horizontal filter 4 is blunted and attenuated. Thus the judgment circuit 17 determines that the output signal of the horizontal width extender 16 is to be selected, and supplies the corresponding selection judgment signal to the selector 20.

(2) The case where the output of the comparator 15 indicates that (the output of the horizontal filter 4)≦(the output of the second peak detector 14), and in addition where the first peak detector 13 and the second peak detector 14 output peak value detection pulses:

In this region, it can be judged that the high frequency components of the output of the horizontal filter 4 are attenuated. Thus the judgment circuit 17 determines that the output of the ROM circuit 18 is to be selected, and supplies the corresponding selection judgment signal to the selector 20.

(3) Cases other than the above (1) or (2):

In this region, correct judgment is difficult due to the folding disturbance components for the still picture processing. Thus the output of the horizontal filter 4 is selected.

In response to the output of the judgment circuit 17, the selector 20 selects from among the outputs of the horizontal filter 4, the horizontal width extender 16, and the ROM circuit 18. On the basis of the output signal of the delay circuit 8, the second area filter 19 determines the regions of the output of the selector 20 which are blunted near the edge portions, and improves the rise and fall characteristics of the output signal of the selector 20 by means of the output signal of the delay circuit 8. Namely, in the region where the level of the output signal of the delay circuit 8 representing the one interframe differential data from which the folding disturbance components for the moving picture processing is removed is less than the level of the output signal of the selector 20, the second area filter 19 selects as its own output the output signal of the delay circuit 8, disregarding the output signal of the selector 20. In other regions, the second area filter 19 selects as its output the output signal of the selector 20.

Thus the output of the second area filter 19 constituting the output signal of the edge improver circuit 10 represents the output signal of the horizontal filter 4 the edges of which, however, are improved by means of the circuits interposed therebetween. The sensitivity of this output signal of the edge improver circuit 10 at the data transmission rate of 32.4 Mbps is normalized by the sensitivity converter circuit 6. The method of operation of the sensitivity converter circuit 6 is the same as in the conventional device of FIG. 1.

The output signal of the sensitivity converter circuit 6 exhibits improved edges and thus inevitably contains noise components. The isolated points remover circuit 11 effects the horizontal and vertical correlation judgement, and removes the noise components from the output signal of the sensitivity converter circuit 6.

Thus, at the motion detection data output terminal 7 coupled to the output terminal of the isolated points remover circuit 11 is obtained the motion information data at the data transmission rate of 32.4 Mbps, the sensitivity of which is normalized and the edges thereof are improved.

By the way, the judgment of the judgment circuit 17 above is effected in accordance with the three criterions (1) through (3).

However, it is possible to subdivide the criterions to improve the performance of the edge .improver circuit 10.

Figure 5:
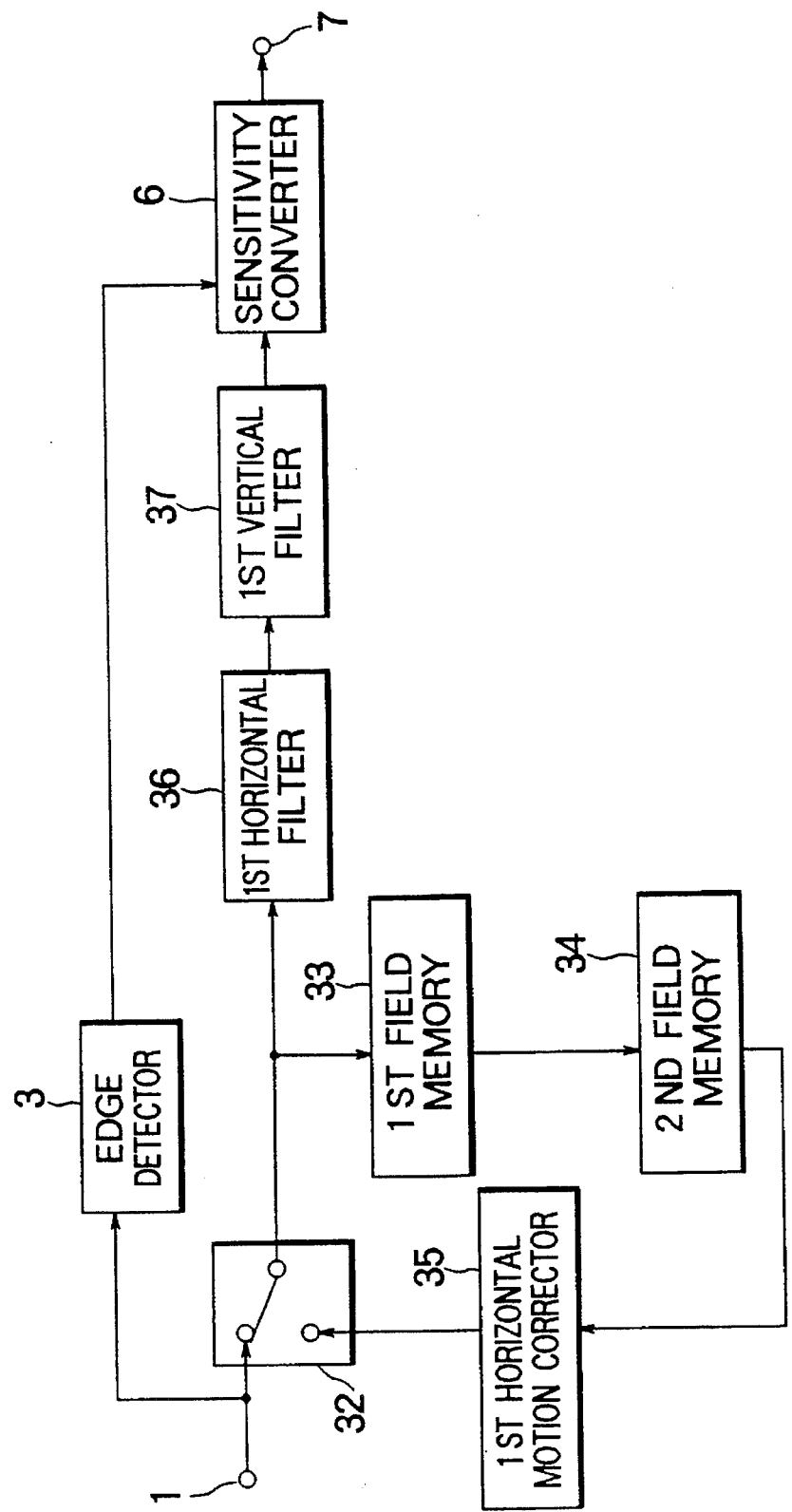
FIG. 5 is a block diagram showing another typical structure of the motion detection circuit for MUSE decoder.

FIG. 5 is a block diagram showing another typical structure of the motion detection circuit for MUSE decoder. The parts 1, 3, 6, and 7 are similar to those shown in FIG. 1. To an interpolator 32 are input the signal arriving at the present data input terminal 1 and the output signal of a first horizontal motion corrector 35. A first field memory 33 has an input terminal coupled to the output of the interpolator 32, and a second field memory 34 has an input terminal coupled to the output of the first field memory 33. The first horizontal motion corrector 35 has an input terminal coupled to the output of the second field memory 34. A first horizontal filter 36 has an input terminal coupled to the output of the interpolator 32. A first vertical filter 37 has an input terminal coupled to the output of the first horizontal filter 36. The sensitivity converter circuit 6 has input terminals coupled to the output of the edge detector circuit 3 and the first vertical filter 37, respectively. The output of the sensitivity converter circuit 6 constitutes the motion detection data output terminal 7.

Figure 2:
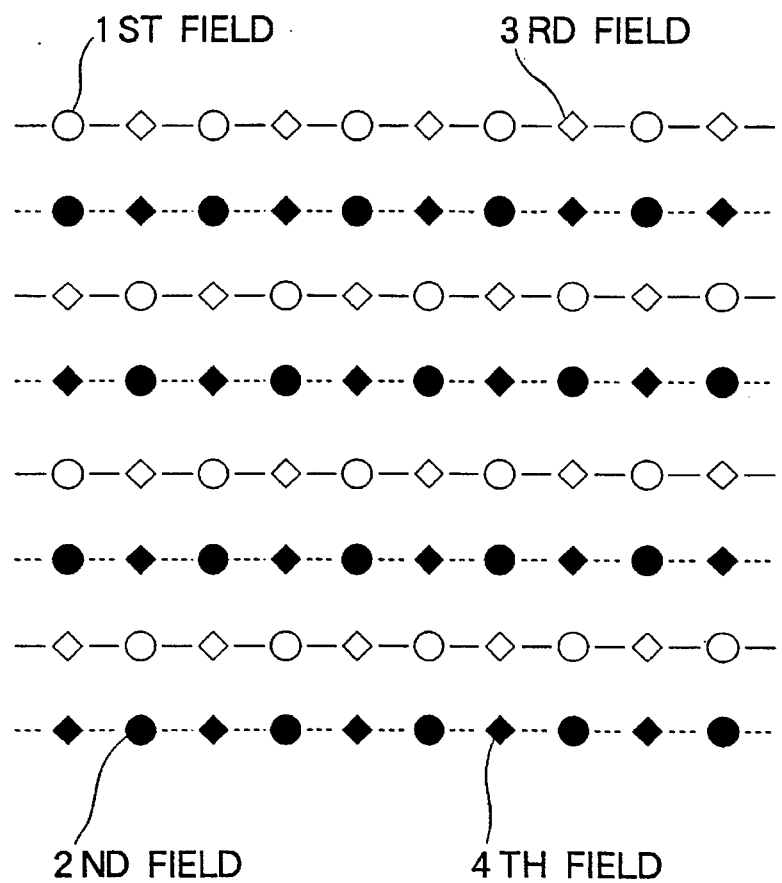
FIG. 2 is a diagram showing the sampling pattern of the luminance signal (Y-signal) for the MUSE (multiple sub-Nyquist sampling encoding) high definition television system.

Next, the method of operation of the motion detection circuit of FIG. 5 is described. The sampling pattern of the luminance signal (Y-signal) of MUSE system is shown in FIG. 2. As described above, the data transmission rate of the Y-signal is 16.2 Mbps.

To the present data input terminal 1 is input the currently transmitted Y-signal data (the present data). The interpolator 32 switches between the present data supplied at the present data input terminal 1 and the output signal of the first horizontal motion corrector 35, at the frequency of 32.4 Mbps, in accordance with the phase of the Y-signal shown in FIG. 2. Thus the output signal of the interpolator 32, referred to as interframe interpolation data, consists of the present data and the data of the preceding frame interpolated therebetween.

The output of the interpolator 32 is supplied to the first field memory 33, whereby it is delayed about 560 horizontal scanning periods (designated as 560 H). The second field memory 34 receives the output signal from the first field memory 33 and further delays it about 565 horizontal scanning periods (565 H). In addition, the second field memory 34 effects the vertical motion correction in accordance with the vertical motion vector transmitted from the transmitter side of the MUSE picture signal.

The first horizontal motion corrector 35 effects horizontal motion correction to the output signal of the second field memory 34 in accordance with the horizontal motion vector transmitted for each field of the picture frames from the transmitter side. The output signal of the first horizontal motion corrector 35 thus represents the output signal of the interpolator 32 delayed by one frame. The methods of operation of the first horizontal filter 36, the first vertical filter 37, and the edge detector circuit 3 are similar to those of the horizontal filter 4 the vertical filter 5 and the edge detector circuit 3, respectively, of FIG. 1.

The motion detection circuit of FIG. 5 has the following disadvantage. Since the motion information is obtained from the one interframe differential (the differential between two successive picture frames), the interfield motion information is not utilized. As a result, the detection of the motion regions within the picture frames may become incomplete.

FIG. 6 is a block diagram showing another motion detection circuit according to this invention which solves the above problem. The parts 1, 3, 6, 7, and 32 through 37 are similar to the corresponding parts of FIG. 5.

A second horizontal motion corrector 41 has an input terminal coupled to the output of the first field memory 33. A 2-H delay circuit 42 has an input terminal coupled to the output of the second horizontal motion corrector 41. A 1-H delay circuit 43 has an input terminal coupled to the output of the 2-H delay circuit 42. A one-field differential extractor 44 has inputs coupled to the outputs of the interpolator 32, the 2-H delay circuit 42, and the 1-H delay circuit 43. A second vertical filter 45 has an input terminal coupled to the output of the one-field differential extractor 44. A one-field differential signal edge improver 46 has an input terminal coupled to the output of the second vertical filter 45. A horizontal extender 47 has an input terminal coupled to the output of the one-field differential signal edge improver 46. A vertical extender 48 has an input terminal coupled to the output of the horizontal extender 47. An isolated points remover 49 has an input terminal coupled to the output of the vertical extender 48. A selector 50 has inputs coupled to the first vertical filter 37 and the isolated points remover 49.

Next the method of operation of the motion detection circuit of FIG. 6 is described. The parts 1, 3, and 32 through 37 operate similarly as the corresponding parts of FIG. 5.

The second horizontal motion corrector 41 effects the horizontal motion correction to the output signal of the first field memory 33 at the data transmission rate of 32.4 Mbps. The output of the second horizontal motion corrector 41, which represents the output signal of the interpolator 32 delayed by 560 H, is supplied to the 2-H delay circuit 42. The 2-H delay circuit 42 delays the output signal of the second horizontal motion corrector 41 by 2-H (two horizontal scanning periods). Thus the output of the 2-H delay circuit 42 represents the output signal of the interpolator 32 delayed by 562 H. The 1-H delay circuit 43 delays the output signal of the 2-H delay circuit 42 by 1 H. Thus the output of the 1-H delay circuit 43 represents the output signal of the interpolator 32 delayed by a horizontal scanning periods of 563 H.

The one-field differential extractor 44 includes a two-dimensional digital filter by which it determines the one-interfield differential (the differential of two successive fields) or the one-interframe sum of one-interfield differentials (both referred collectively as one-interfield differential signal), on the basis of the interfield interpolation data of the present field supplied from the interpolator 32, the interfield interpolation data delayed by 562 H supplied from the 2-H delay circuit 42, and the interfield interpolation data delayed by 563 H supplied from the 1-H delay circuit 43. The data transmission rate of the output signal of the one-field differential extractor 44 is 32.4 Mbps.

The second vertical filter 45, having an input terminal supplied with the one-interfield differential signal from the one-field differential extractor 44, removes the folding disturbance components (aliasing noises) near the vertical frequency µ0 contained in the one-interfield differential signal.

The one-field differential signal edge improver 46 improves the edges of the output signal of the second vertical filter 45, and outputs the resulting one-interfield differential signal exhibiting improved edges to the horizontal extender 47.

Figure 7:
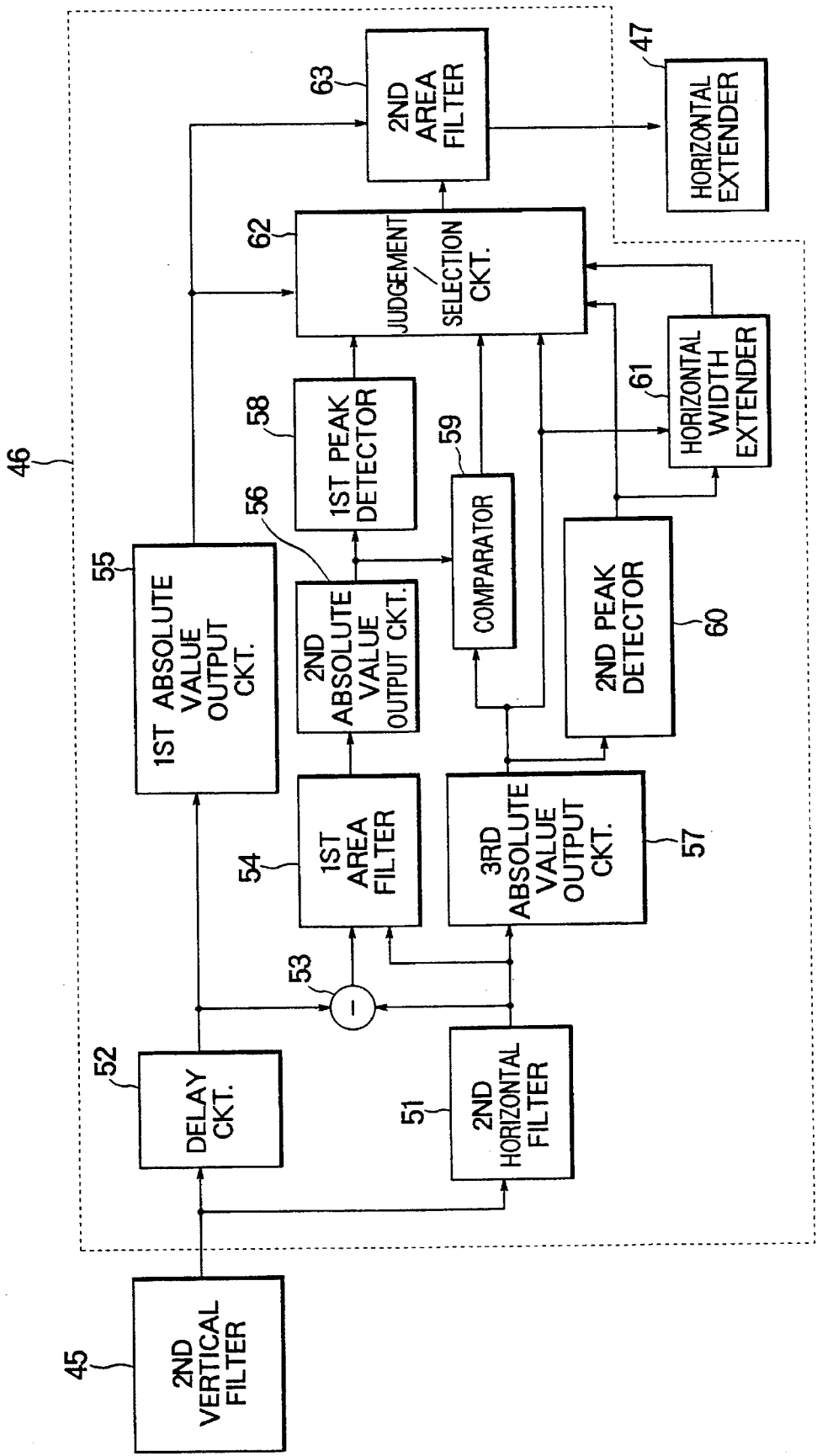
FIG. 7 is a block diagram showing the details of the one-field differential signal edge improver of FIG. 6.

FIG. 7 is a block diagram showing the details of the one-field differential signal edge improver of FIG. 6. Referring to FIG. 7, the method of operation of the one-field differential signal edge improver 46 is described in detail.

The output signal of the second vertical filter 45 at the data transmission rate of 32.4 Mbps is supplied to the second horizontal filter 51 and the delay circuit 52. The second horizontal filter 51 limits the frequency band of the input signal to under the horizontal frequency µ0 and thereby removes the folding disturbance components for the still picture processing. The delay circuit 52 imparts the same delay to the output signal of the second vertical filter 45 as the delay of the second horizontal filter 51.

The subtractor 53 calculates the difference between the output signals of the second horizontal filter 51 and the delay circuit 52. The output signal of the subtractor 53 is the difference between the outputs of the delay circuit 52 and the second horizontal filter 51, which thus represents the one interfield differential data consisting of components above horizontal frequency µ0. This signal contains folding disturbance components for the still picture processing.

A first area filter 54 determines the valid and invalid regions of the output signal of the subtractor 53 on the basis of the output of the second horizontal filter 51. Namely, in the regions where the output of the second horizontal filter 51 is in the neighborhood of 0 (zero), the first area filter 54 judges that the output of the subtractor 53 is invalid and clips the output signal of the subtractor 53 to 0 (zero) even when the output signal of the subtractor 53 is in a region of significant values. Under such circumstances, the output signal of the first area filter 54 vanishes. Otherwise, the output signal of the first area filter 54 is equal to the output signal of the subtractor 53.

The first absolute value output circuit 55 outputs the absolute value of the output signal of the delay circuit 52. The second absolute value output circuit 56 outputs the absolute value of the output signal of the first area filter 54.

The third absolute value output circuit 57 outputs the absolute value of the output signal of the second horizontal filter 51. By converting these signals to the corresponding absolute values, the dynamic ranges of the original signals can be reduced, thereby reducing the number of bits necessary for the implementation of hardware. The size of the hardware can thus be minimized.

A first peak detector 58 has an input terminal supplied with the output of the second absolute value output circuit 56 and detects maximal or peak values of the output signal of the second absolute value output circuit 56 by comparing the neighboring data values of the output signal of the second absolute value output circuit 56. The first peak detector 58 outputs detection pulses to a judgement/selection circuit 62. A comparator 59 compares the levels of the outputs of the second absolute value output circuit 56 and the third absolute value output circuit 57, and outputs to the judgement/selection circuit 62 the high and low level signals at the data transmission rate of 32.4 Mbps indicating the result of comparison. A second peak detector 60 has an input terminal supplied from the output signal of the third absolute value output circuit 57 at the data transmission rate of 32.4 Mbps and detects the peak values by comparing the neighboring data values thereof. The detection pulses output from the second peak detector 60 is supplied to the horizontal width extender 61 and the judgement/selection circuit 62.

The horizontal width extender 61 has input terminals supplied from the output signals of the third absolute value output circuit 57 and the second peak detector 60 and holds all the peak value detection pulses supplied from the second peak detector 60 during the filter tap length of the second horizontal filter 51. Further, on the basis of the detection pulses thus held therein, the horizontal width extender 61 selects and outputs the peak value nearest to the current output signal of the third absolute value output circuit 57. On the basis of the outputs of the first peak detector 58, the comparator 59, and the second peak detector 60, the judgement/selection circuit 62 determines which signal is to be selected from among the outputs of the first absolute value output circuit 55, the third absolute value output circuit 57 and the horizontal width extender 61, and outputs the selected signal.

Next, the method of judgment of the judgement/selection circuit 62 is described.

(1) The case where the output of the comparator 59 indicates that (the output of the third absolute value output circuit 57)>(the output of the second absolute value output circuit 56):

In this region, it can be judged that the output of the second horizontal filter 51 is blunted and attenuated. Thus the judgement/selection circuit 62 selects the output signal of the horizontal width extender 61.

(2) The case where the output of the comparator 59 indicates that (the output of the third absolute value output circuit 57)≦(the output of the second absolute value output circuit 56), and in addition, where the first peak detector 58 and the second peak detector 60 output peak value detection pulses:

In this region, it can be judged that the high frequency components of the output of the second horizontal filter 51 are attenuated. Thus the judgement/selection circuit 62 selects the output of the first absolute value output circuit 55 from which the high frequency components are not removed.

(3) Cases other than the above (1) or (2):

In this region, correct judgment is difficult due to the folding disturbance components for the still picture processing. Thus the output of the third absolute value output circuit 57 is selected.

By means of the output signal of the first absolute value output circuit 55, the second area filter 63 determines the regions of the output of the judgement/selection circuit 62 where the portions near the edges are blunted, and improves the fall characteristics of the output signal of the judgement/ selection circuit 62. Namely, in the region where the level of the output signal of the first absolute value output circuit 55 representing the one interfield differential data from which the folding disturbance components for the moving picture processing is removed is less than the level of the output signal of the judgement/selection circuit 62, the second area filter 63 selects as its own output the output signal of the first absolute value output circuit 55, disregarding the output signal of the judgement/selection circuit 62. In other regions, the second area filter 63 selects as its output the output signal of the judgement/selection circuit 62.

Thus, at the output of the second area filter 63 is obtained a one-interfield differential signal exhibiting improved edges at the data transmission rate of 32.4 Mbps. Since sub-Nyquist sampling is effected in accordance with the MUSE, the one-interfield differential signal includes portions from which the motion information has dropped off. Thus, the horizontal extender 47 and the vertical extender 48 compensates for the motion information which has dropped out of the one-interfield differential signal supplied from the one-field differential signal edge improver 46. Namely, with respect to the output signal of the one-field differential signal edge improver 46, the horizontal extender 47 determines a maximum or peak value of the neighboring data values in the horizontal direction, and outputs it to the vertical extender 48. With respect to the output signal of the horizontal extender 47, the vertical extender 48 determines a maximum or peak value of the neighboring data values of the signal in the vertical direction.

The output signal of the vertical extender 48 includes noise components amplified by the one-field differential signal edge improver 46. The isolated points remover 49 effects the horizontal and vertical correlation judgment and thereby removes the noise components from the output signal of the vertical extender 48. The selector 50 compares the levels of the output signals of the first vertical filter 37 and the isolated points remover 49, and selects and outputs the signal at the higher level to the sensitivity converter circuit 6. The sensitivity of the output signal of the selector 50 at the data transmission rate of 32.4 Mbps is normalized by the sensitivity converter circuit 6. The method of operation of the sensitivity converter circuit 6 is the same as described above.

Thus, at the motion detection data output terminal 7 coupled to the output terminal of the sensitivity converter circuit 6 is obtained the motion information data at the data transmission rate of 32.4 Mbps, the sensitivity of which is normalized and by which the rapid vertical motions in the picture frames can be traced without failure.

By the way, the judgment of the judgement/selection circuit 62 above is effected in accordance with the three criterions (1) through (3). However, it is possible to subdivide the criterions to improve the performance of the one-field differential signal edge improver 46.

Figure 8:
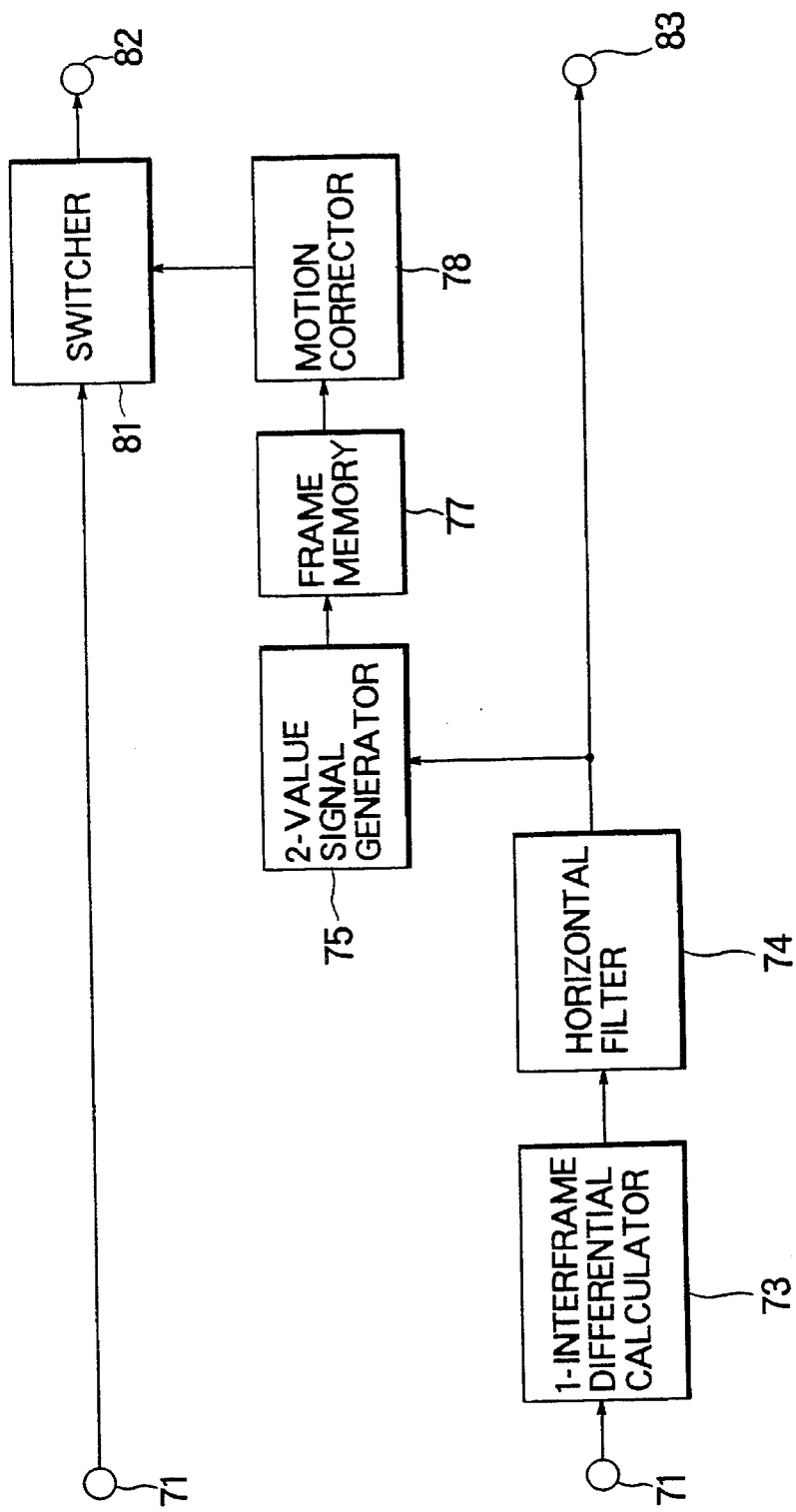
FIG. 8 is a block diagram showing still another typical structure of the motion detection circuit for MUSE decoder.

FIG. 8 is a block diagram showing still another typical structure of the motion detection circuit for MUSE decoder. To the two-interframe differential signal input terminal 71 is input a two interframe differential signal, and to the interframe interpolation signal input terminal 72 is input a one interframe interpolation signal. A one-interframe differential calculator 73 has an input coupled to the interframe interpolation signal input terminal 72. A horizontal filter 74 has an input terminal coupled to the output of the one-interframe differential calculator 73. A two-value signal generator 75 has an input terminal coupled to the output of the horizontal filter 74. A frame memory 77 has an input terminal coupled to the output of the two-value signal generator 75. A motion corrector circuit 78 has an input terminal coupled to the output of the frame memory 77. A switcher circuit 81 has input terminals coupled to the two-interframe differential signal input terminal 71 and the output of the motion corrector circuit 78. The output of the switcher circuit 81 is supplied to the circuit at the later stage via the two-interframe differential signal output terminal 82. The output of the horizontal filter 74 is supplied to the circuit at the later stage via the one-interframe differential signal output terminal 83.

Next the operation of the motion detection circuit of FIG. 8 is described. FIG. 2 is a diagram showing the sampling pattern of the luminance signal (Y-signal) for the MUSE (multiple sub-Nyquist sampling encoding) high definition television system. To the two-interframe differential signal input terminal 71 is input the two interframe differential signal which is obtained by subtracting from the currently transmitted signal (the data at the current sampling positions represented by white circles, white diamonds, black circles, or black diamonds) the signal transmitted two frames earlier.

To the interframe interpolation signal input terminal 72 is input the interframe interpolation signal at the data transmission rate of 32.4 Mbps obtained by interpolating the signal transmitted one frame earlier into the currently transmitted signal consisting of the white circles and the diamonds or the black circles and diamonds shown in FIG. 2.

With respect to the signal input to the interframe interpolation signal input terminal 72, the one-interframe differential calculator 73 calculates the differential signal between the central sampling points and the points neighboring them horizontally. Namely, the one-interframe differential calculator 73 calculates the one interframe differential signal by subtracting the signal of the preceding frame at sampling points displaced from the currently transmitted signal.

The horizontal filter 74 consisting of a low pass filter obtains the low frequency components of the one interframe differential signal output from the one-interframe differential calculator 73, and, via the one-interframe differential signal output terminal 88, outputs it to the circuits at the subsequent stage, where it is processed to obtain the detection signal. As described above, the MUSE signal contains folding disturbance components above the horizontal frequency 4 MHz (μ0), and hence the band width of the one interframe differential signal is limited under μ0 by the horizontal filter 74.

As described above by reference to FIG. 2, the MUSE signal is transmitted in a cycle of four fields. The motion regions which are necessary here are those of the currently transmitted signal and of the signal of preceding frame. On the basis of the two interframe differential signal, however, the motion regions of the preceding frame signal cannot be detected.

Figure 9:
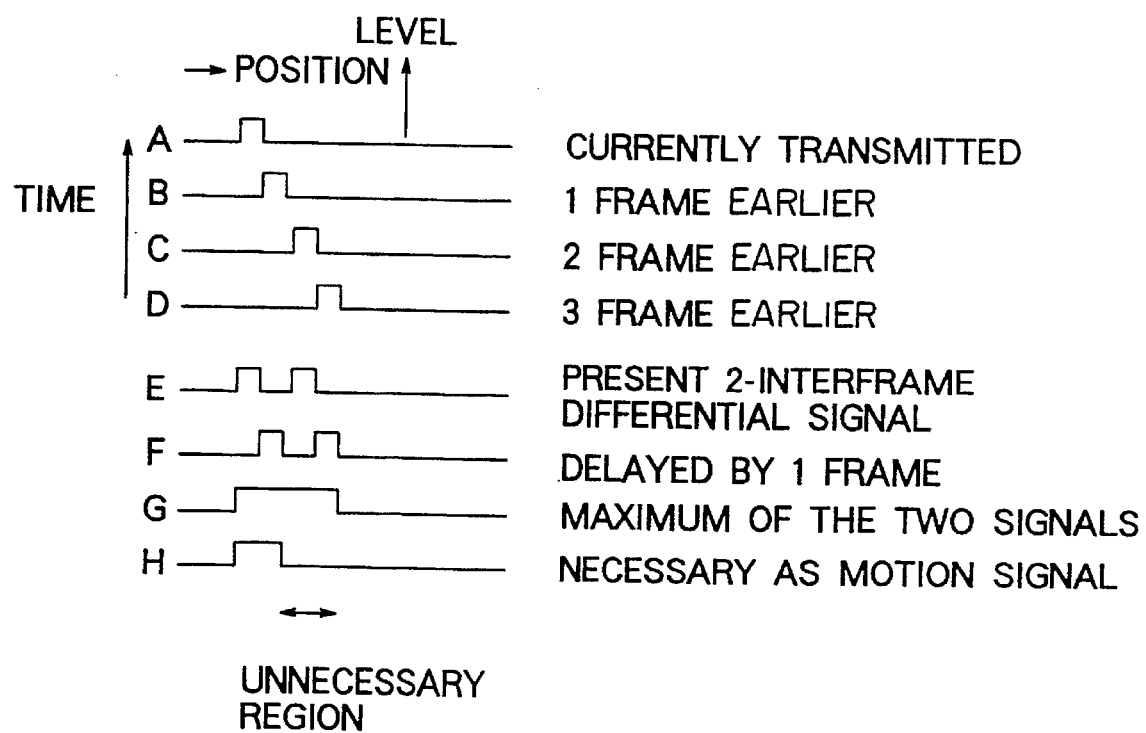
FIG. 9 shows waveforms of: the currently transmitted signal (A), the signal transmitted one frame earlier (B), the signal transmitted two frames earlier (C), the signal transmitted three frames earlier (C), the present two-interframe differential signal (E), the two-interframe differential signal delayed by one frame (F), the maximum (G) of the above two signals E and F, and the signal which is necessary as motion signal (H)

FIG. 9 shows waveforms of: the currently transmitted signal (A), the signal transmitted one frame earlier (B), the signal transmitted two frames earlier (C), the signal transmitted three frames earlier (C), the present two-interframe differential signal (E), the two-interframe differential signal delayed by one frame (F), the maximum (G) of the above two signals E and F, and the signal which is necessary as motion signal (H). In the case of the motion regions detection using the two-interframe differential signal, the motion regions are detected using the maximum value G of the differential signal E and the differential signal F delayed by one frame therefrom. In the case of this method of detection:, however, the unnecessary regions (i.e. The motion regions of the signals two and three frames earlier than the present signal, indicated by the double-headed arrow at the bottom in FIG. 9) are detected simultaneously.

Thus, for the purpose of removing the unnecessary region, the one-interframe differential signal is converted into two-value signal (a signal having two values or levels), and is delayed by one frame, to suppress the motion region two frames earlier. This is effected as follows.

The two-value signal generator 75 converts the output signal of the horizontal filter 74 into a two value signal by means of a predetermined threshold value. The frame memory 77 delays the output signal of the two-value signal generator 75 by one frame. The motion corrector circuit 78 effects two dimensional positional compensation for the two value signal delayed by one frame, by means of the vector quantity detected at transmission side and transmitted as the control signal therefrom.

In response to the two value signal supplied from the motion corrector circuit 78, the switcher circuit 81 suppresses the passage of the two-interframe differential signal from the two-interframe differential signal input terminal 71 to the two-interframe differential signal output terminal 82. Thus, the unnecessary motion region two frames earlier within the two-interframe differential signal is interrupted, and only the motion region of the present signal within the two interframe differential signal is output to the circuits at the subsequent stage, where it is processed to obtain motion detection signal.

In the case of the above motion detection circuit of FIG. 8, the one-interframe differential signal from which folding disturbance components are removed is limited to the frequency range under the horizontal frequency μ0, and hence the motion information above this horizontal frequency μ0 cannot be obtained therefrom. Further, the edge portions of the differential signal are blurred and made unclear. When the unnecessary motion region within the two-interframe differential signal having the motion information exclusively above the horizontal frequency μ0 is suppressed by means of such differential signal with blurred edges, the unnecessary motion region cannot be detected. Further, since the edge portions of the above differential signal are blurred and hence the points crossing the threshold values of the two-value signal generator 75 may be displaced from the proper positions thereof, the width of the high or the low level of two-value signal for suppressing the two-interframe differential signal may become too wide or too narrow. Thus, the necessary motion region may be suppressed, or the unnecessary region may be left unsuppressed.

Figure 10:
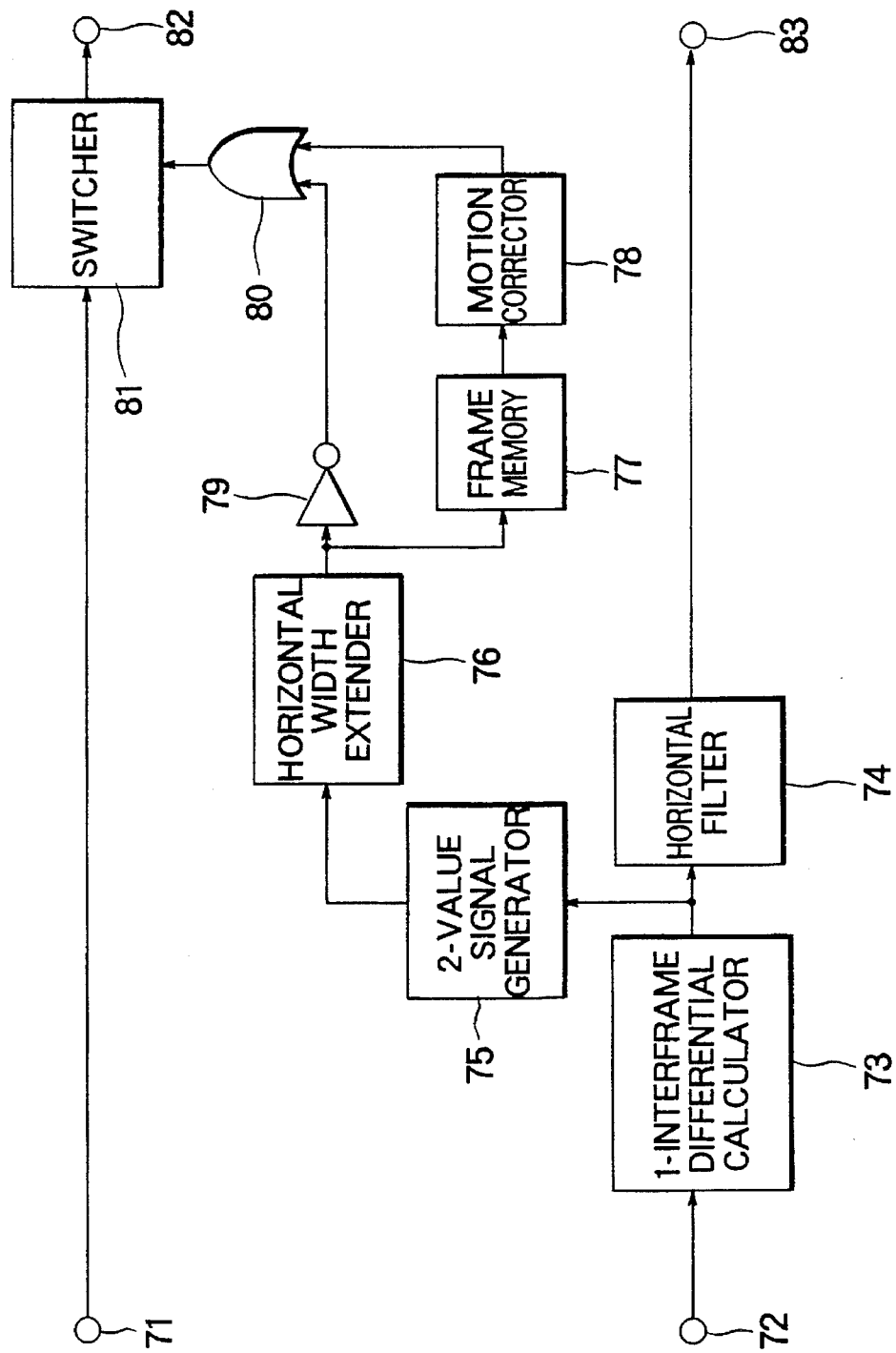
FIG. 10 is a block diagram showing still another motion detection circuit according to this invention.

FIG. 10 is a block diagram showing still another motion detection circuit according to this invention which aims at solving the above problem. The parts 71 through 75 and 82 and 83 are similar to those of FIG. 8. The horizontal width extender 76 has an input terminal coupled to the output of the two-value signal generator 75. The frame memory 77 has an input terminal coupled to the output of the horizontal width extender 76. The motion corrector circuit 78 has an input terminal coupled to the output of the frame memory 77. The inverter (NOT circuit) 79 has an input terminal coupled to the output of the horizontal width extender 76.

The OR gate 80 has input terminals coupled to outputs of the motion corrector circuit 78 and the inverter (NOT circuit) 79. The switcher circuit 81 has input terminals coupled to the two-interframe differential signal input terminal 71 and the output the OR gate 80.

Next, the method of operation of the motion detection circuit of FIG. 10 is described. The methods of operation of the parts 71 through 75 are similar to corresponding parts of FIG. 8. The horizontal width extender 76 extends the horizontal width of the two-value signal output from the two-value signal generator 75. As described above, the one-interframe differential signal is obtained by calculating the difference between the central sampling points and the horizontally neighboring points thereof. If this one-interframe differential signal is converted into the two-value signal for driving the switcher circuit 81 on the basis of a predetermined threshold, unnecessary motion region may be left unsuppressed. Thus, the horizontal width extender 76 extends the horizontal width to ensure that the unnecessary motion region is suppressed.

The frame memory 77 and the motion corrector circuit 78 operate similarly as the corresponding parts of FIG. 8. Namely, the frame memory 77 delays the output signal of the horizontal width extender 76 by one frame. The motion corrector circuit 78 effects two-dimensional positional correction to the output signal of the frame memory 77.

The inverter (NOT circuit) 79 inverts; the polarity of the output signal of the horizontal width extender 76. If the switcher circuit 81 is driven by the output signal of the inverter (NOT circuit) 79 and thereby limits the, two-dimensional image region of the two-interframe differential signal which is input to the two-interframe differential signal input terminal 71, all the regions outside of the motion region of the currently transmitted signal is suppressed. Thus the OR gate 80 obtains the logical sum of the output signal of the motion corrector circuit 78 and the output signal of the inverter (NOT circuit) 79, and the switcher circuit 81 is driven by the output signal of the OR gate 80, thereby limiting the two-dimensional image region of the two-interframe differential signal supplied to the two-interframe differential signal input terminal 71.

In the above operation, the output signals of the motion corrector circuit 78 and the inverter (NOT circuit) 79 limit (suppress) the motion region two frames earlier than the present signal data within the two-interframe differential signal and the region outside of the currently transmitted motion region within the two-interframe differential signal, respectively. The limitation of the region exclusively by means of the motion corrector circuit 78 may result in suppression of the necessary motion region. On the other hand, in the case of the limitation by means of the output signal of the inverter (NOT circuit) 79, the signal region which is the currently transmitted motion region and exclusively of high frequency components is suppressed. Thus, by driving the switcher circuit 81 by the logical sum of the two signals, the regions which are necessary for motion regions are left unsuppressed. The unnecessary motion regions within the two-interframe differential signal are suppressed and motion detection signal of good quality exclusively indicative of the necessary motion regions is obtained.

Figure 5A:
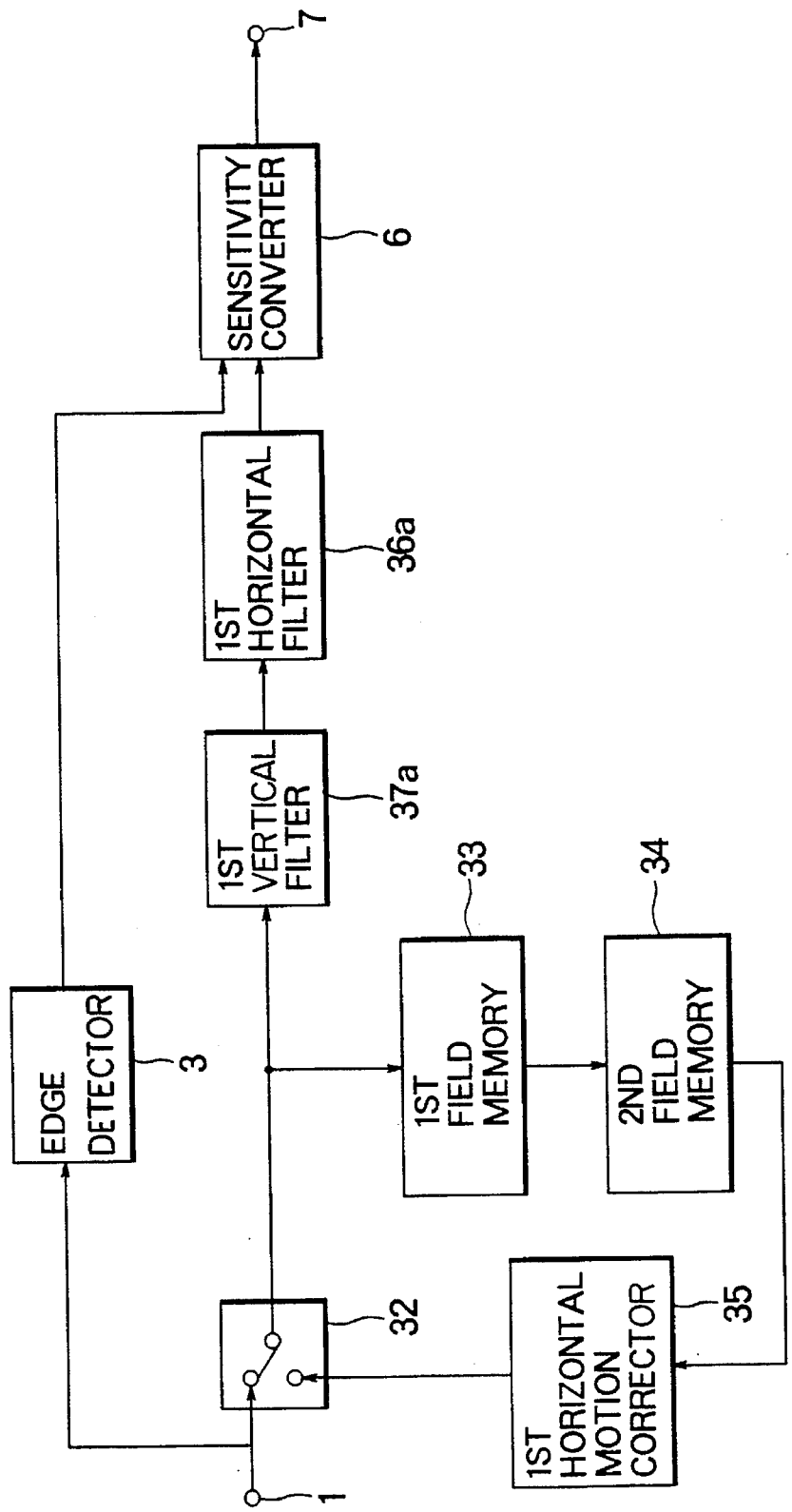
FIG. 5a is a block diagram showing another typical structure of the motion detection circuit for MUSE decoder similar to that of FIG. 5.

FIG. 5a is a block diagram showing another typical structure of the motion detection circuit for MUSE decoder which is similar to that of FIG. 5. However, the first vertical filter 37a is coupled to an output of the interpolator 32. The first vertical filter 37a obtains the one-interframe differential from the interframe interpolation data output from the interpolator 32 and then removes the folding disturbance components via the moving picture processing near the vertical frequency 1125/4 (c/h) contained in the output of the interpolator 32. The first horizontal filter 36a is coupled to the output of the first vertical filter 37a. The first vertical filter 37a limits the frequency region of the output signal of the first horizontal filter 36a to under 4 mhz (µ0), thereby removing the folding disturbance components via the still picture processing. Otherwise, the circuit of FIG. 5a is similar to that of FIG. 5.

Figure 11:
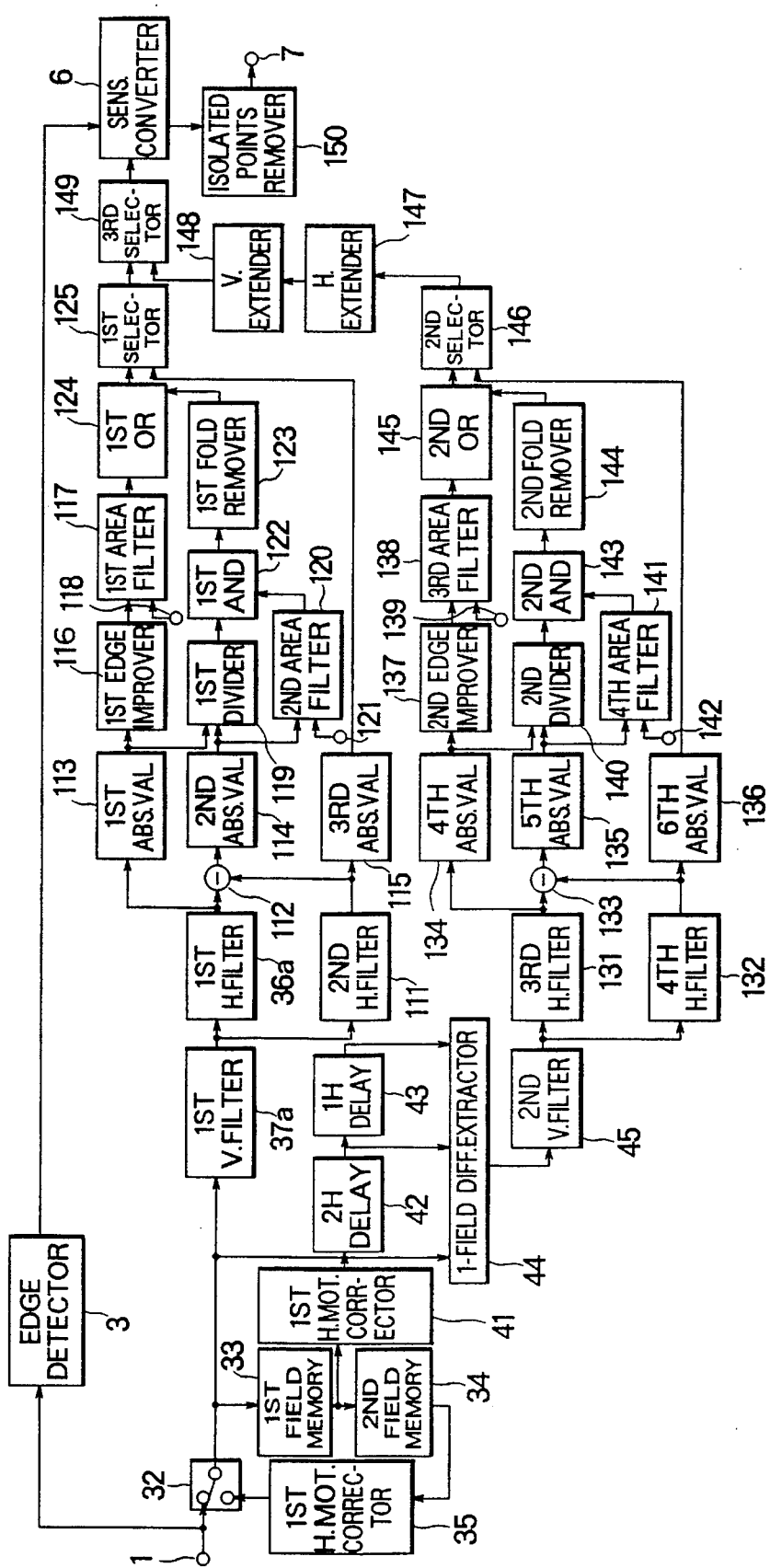
FIG. 11 is a block diagram showing still another motion detection circuit according to this invention.

FIG. 11 is a block diagram showing still another motion detection circuit according to this invention, which is an improvement over the motion detection circuit of FIG. 5a and is partially similar to the motion detection circuit of FIG. 6. Thus, the parts 1, 3, 6, 32 through 35, 36a, 37a, and 41 through 45 are similar to the corresponding parts of FIG. 5a or 6.

Second horizontal filter 111 has an input terminal coupled to the output of the first vertical filter 37a. First subtractor 112 has input terminals coupled to the outputs of the first horizontal filter 36a and the second horizontal filter 111. First absolute value output circuit 113 has an input terminal coupled to the output of the first horizontal filter 36a. Second absolute value output circuit 114 has an input terminal coupled to the output of the first subtractor 112. Third absolute value output circuit 115 has an input terminal coupled to the output of the second horizontal filter 111. First edge improver 116 has an input terminal coupled to the output of the first absolute value output circuit 113. First area filter 117 has input terminals coupled to outputs of the first edge improver 116 and the first threshold data input terminal 118. First divider 119 has input terminals coupled to outputs of the first absolute value output circuit 113 and the second absolute value output circuit 114.

Second area filter 120 has input terminals coupled to outputs of the second absolute value output circuit 114 and the second threshold data input terminal 121. First AND circuit 122 has input terminals coupled to outputs of the first divider 119 and the second area filter 120. First folding remover 123 has an input terminal coupled to the output of the :first AND circuit 122. First OR circuit 124 has input terminals coupled to outputs of the first area filter 117 and the first folding remover 123. First selector 125 has input terminals coupled to outputs of the third absolute value output circuit 115 and the first OR circuit 124.

Third horizontal filter 131 has an input terminal coupled to the output of the second vertical filter 45. Fourth horizontal filter 132 has an input terminal coupled to the output of the second vertical filter 45. Second subtractor 133 has input terminals coupled to outputs of the third horizontal filter 131 and the fourth horizontal filter 132. Fourth absolute value output circuit 134 has an input terminal coupled to the output of the third horizontal filter 131. Fifth absolute value output circuit 135 has an input terminal coupled to the output of the second subtractor 133. Sixth absolute value output circuit 136 has an input terminal coupled to the output of the fourth horizontal filter 132. Second edge improver 137 has an input terminal coupled to the output of the fourth absolute value output circuit 134. Third area filter 138 has input terminals coupled to outputs of the second edge improver 137 and the third threshold data input terminal 139.

Second divider 140 has input terminals coupled to outputs of the fourth absolute value output circuit 134 and the fifth absolute value output circuit 135. Fourth area filter 141 has input terminals coupled to outputs of the fifth absolute value output circuit 135 and the fourth threshold data input terminal 142. Second AND circuit 143 has input terminals coupled to outputs of the second divider 140 and the fourth area filter 141. Second folding remover 144 has an input terminal coupled to the output of the second AND circuit 143. Second OR circuit 145 has input terminals coupled to outputs of the third area filter 138 and the second folding remover 144. Second selector 146 has input terminals coupled to outputs of the second OR circuit 145 and the sixth absolute value output circuit 136. Horizontal extender 147 has an input terminal coupled to the output of the second selector 146. Vertical extender 148 has an input terminal coupled to the output of the horizontal extender 147. Third selector 149 has input terminals coupled to outputs of the first selector 125 and the vertical extender 148. The sensitivity converter circuit 6 has input terminals coupled to the outputs of the edge detector circuit 3 and the third selector 149. Isolated points remover 150 has an input terminal coupled to the output of the sensitivity converter circuit. 6. The output terminal of the isolated points remover 150 constitutes the motion detection data output terminal 7.

Next the method of operation of the motion detection circuit of FIG. 11 is described.

The parts 1, 6, 7, and 32 through 35 operate similarly as the corresponding parts of the motion detection circuit of FIG. 5. The method of operation of the edge detector circuit 3 is also similar to that of FIG. 5 in that it extracts the edge components and the high level components of the transmitted data of the present field. However, the signal processed by the edge detector circuit 3 of FIG. 11 includes horizontal frequencies ranging from low to high frequencies. The output signal of the first vertical filter 37a is a one-interframe differential signal from which the frequency components in slantwise direction near the vertical frequency v0 are removed. The second horizontal filter 111 removes the folding disturbance components of low vertical frequency in the neighborhood of horizontal frequency 16.2 MHz of the output signal of the first vertical filter 37a.

The first subtractor 112 subtracts from the output signal of the second horizontal filter 111 the output signal of the first horizontal filter 36a, and outputs the one-interframe differential signal consisting of components above horizontal frequency µ0. This signal includes folding disturbance components via the still picture processing.

The output signal of the first horizontal filter 36a is at the data transmission rate of 32.4 Mbps and under the horizontal frequency µ0. This signal includes hardly any folding disturbance components for the motion and the still picture processing. The first absolute value output circuit 113 outputs the absolute value of the output signal of the first horizontal filter 36a. The second absolute value output circuit 114 outputs the absolute value of the output signal of the first subtractor 112. The third absolute value output circuit 115 outputs the absolute value of the output signal of the second horizontal filter 111. By obtaining the absolute values of these signals, the dynamic ranges of the signals are reduced and thus the number of bits used in the hardware implementation can be reduced. As a result, the size of the hardware can be reduced.

Receiving the output signal of the first absolute value output circuit 113, the first edge improver 116 improves the rise and fall edge portions of the signal that are blunted (blurred) by the first horizontal filter 36a, and outputs the signal with the improved edges to the first area filter 117.

The first area filter 117 compares the output signal the first edge improver 116 with the threshold value supplied at the first threshold data input terminal 118, and outputs the result of comparison judgment in the form of a two-value signal., This two-value signal at the data transmission rate of 32.4 Mbps is obtained from the low frequency components of the one-interframe differential signal, and hence, provided that the threshold level at the first threshold data input terminal 118 is set appropriately, represents the motion information data for the pictures including no folding disturbance components via the still picture processing.

The first divider 119 divides the output signal of the second absolute value output circuit 114 by the output signal of the first absolute value output circuit 113, and then judges whether or not the result of division is within the range corresponding to the predetermined frequency range. The first divider 119 outputs the result of the judgment in the form of a two-value signal.

The second area filter 120 compares the output signal the second absolute value output circuit 114 with the threshold value supplied at the second threshold data input terminal 121, and outputs the result of comparison judgment in the form of a two-value signal.

The first AND circuit 122 has input terminals coupled to the outputs of the first divider 119 and the second area filter 120, and outputs the logical product of these two two-value signals. The output signal of the first AND circuit 122 at the data transmission rate of 32.4 Mbps is a signal representing whether or not the present data is in the motion region of the picture. Since this signal is obtained from the motion information extracted as the high frequency components of the one-interframe differential signal, this signal includes the folding disturbance component information via the still picture processing.

Receiving the output signal of the first AND circuit 122, the first folding remover 123 removes therefrom the folding disturbance components via the still picture processing, on the basis of the horizontal and vertical two-dimensional correlations within the pictures.

The first OR circuit 124 outputs the logical sum of the output signals of the first area filter 117 and the first folding remover 123 to the first selector 125.

In accordance with the output signal of the first OR circuit 124, the first selector 125 selects and outputs (i.e., suppresses or passes through) the output signal of the third absolute value output circuit 115. The output signal of the first selector 125 is the motion information data obtained via the one-interframe differential signal and selected on the basis of the output signal of the first OR circuit 124 which is not affected by the folding disturbance components via the moving and the still picture processing. Thus the output signal of the first selector 125 does not include the folding disturbance components via the moving and the still picture processing.

The operations of the parts 41 through 45 are as described above by reference to FIG. 6.

Receiving the output signal of the second vertical filter 45, the third horizontal filter 131 limits the horizontal frequency of the signal to under μ0, and thereby removes the folding disturbance components via the still picture processing.

Receiving the output signal of the second vertical filter 45, the fourth horizontal filter 132 removes the folding disturbance components of low vertical frequency in the neighborhood of horizontal frequency 16.2 MHz thereof.

The second subtractor 133 subtracts from the output signal of the fourth horizontal filter 132 the output signal of the third horizontal filter 131, and outputs the one-interfield differential signal consisting of components above horizontal frequency μ0. This signal includes folding disturbance components via the still picture processing.

The output signal of the third horizontal filter 131 is at the data transmission rate of 32.4 Mbps and the horizontal frequency components thereof are under μ0. This signal includes scarcely any folding disturbance components via the moving and the still picture processing. The fourth absolute value output circuit 134 outputs the absolute value of this signal. The fifth absolute value output circuit 135 outputs the absolute value of the second subtractor 133. The sixth absolute value output circuit 136 outputs the absolute value of the fourth horizontal filter 132. The circuits 134 through 136 provide similar effects as the absolute value output circuits 113 through 115 described above.

Receiving the output signal of the fourth absolute value output circuit 134, the second edge improver 137 improves the rise and fall edge portions of the signal that are blunted (blurred) by the third horizontal filter 131, and outputs the signal with the improved edges to the third area filter 138.

The third area filter 138 compares the output signal of the second edge improver 137 with the threshold value supplied at the third threshold data input terminal 139, and outputs the result of comparison judgment in the form of a two-value signal. This two-value signal at the data transmission rate of 32.4 Mbps is obtained from the low frequency components of the one-interfield differential signal, and hence, provided that the threshold level at the third threshold data input terminal 139 is set appropriately, represents the motion information data for the pictures including no folding disturbance components via the still picture processing.

The second divider 140 divides the output signal of the fifth absolute value output circuit 135 by the output signal of the fourth absolute value output circuit 134, and then judges whether or not the result of division is within the range corresponding to the predetermined frequency range. The second divider 140 outputs the result of the judgment in the form of a two-value signal.

The fourth area filter 141 compares the output signal the fifth absolute value output circuit 135 with the threshold value supplied at the fourth threshold data input terminal 142, and outputs the result of comparison judgment in the form of a two-value signal.

The second AND circuit 143 has input terminals coupled to the outputs of the second divider 140 and the fourth area filter 141, and outputs the logical product of these two two-value signals. The output signal of the second AND circuit 143 at the data transmission rate of 32.4 Mbps is a signal representing whether or not the present data is in the motion region. Since this signal is obtained from the motion information extracted as the high frequency components of the one-interfield differential signal, this signal includes the folding disturbance component information via the still picture processing.

Receiving the output signal of the second AND circuit 143, the second folding remover 144 removes therefrom the folding disturbance components via the still picture processing utilizing the horizontal and vertical two-dimensional correlations in the pictures.

The second OR circuit 145 outputs the logical sum of the output signals of the third area filter 138 and the second folding remover 144 to the second selector 146.

In accordance with the output signal of the second OR circuit 145, the second selector 146 selects and outputs (i.e., suppresses or passes through) the output signal of the sixth absolute value output circuit 136. The output signal of the second selector 146 is the motion information data obtained via the one-interfield differential signal and selected on the basis of the output signal of the second OR circuit 145 which is not affected by the folding disturbance components via the moving and the still picture processing. Thus the output signal of the second selector 146 does not include the folding disturbance components via the moving and the still picture processing.

Since subsampling is effected in accordance with the MUSE system, the motion information may drop out and the one-interfield differential signal may exhibit incomplete motion information. Thus, this incompleteness of the motion information is compensated for by means of the horizontal extender 147 and the vertical extender 148. Namely, with respect to the output signal of the second selector 146, the horizontal extender 147 obtains the maximum or peak value within the neighboring data in the horizontal direction, and outputs it to the vertical extender 148. With respect to the output signal of the horizontal extender 147, the vertical extender 148 obtains the maximum or peak value within the neighboring data in the vertical direction, and outputs it to the third selector 149.

The third selector 149 compares the output signals of the first selector 125 and the vertical extender 148 with each other, and outputs the greater of the two signal.

The output signal of the third selector 149 is normalized by the sensitivity converter circuit 6 on the basis of the output signal of the edge detector circuit 3 having the present data as the input. The method of operation of the sensitivity converter circuit 6 is the same as that of FIG. 5 or 6.

The noise components of the signal input to the isolated points remover 150 are amplified before the signal is input to the sensitivity converter circuit 6. The isolated points remover 150 effects the horizontal and vertical correlation judgment, and thereby removes these noise components from the output signal of the sensitivity converter circuit 6. Thus, at the motion detection data output terminal 7 is obtained the motion information data at the data transmission rate of 32.4 Mbps.

The motion detection circuit of FIG. 11 provide following advantages. First, the interframe and the interfield motion information without folding disturbance components via the moving and still picture processing can be obtained up to a high frequency.

Further, since the second horizontal filter 111 removes the felding disturbance components of low vertical frequency in the neighborhood of horizontal frequency 16.2 MHz of the output signal of the first vertical filter 37a, the interframe motion information without adverse effects of the folding disturbance components near the horizontal frequency 16.2 MHz can be obtained.

Furthermore, due to the provision of the first divider 119 and the first AND circuit 122 the output signal of which is a signal representing whether or not the present data is in the motion region of the picture, the existence or non-existence of the motion information in the predetermined frequency range of the high frequency component of the one-interframe differential signal can be obtained by a simple and small-sized circuit.

Further, the provision of the first area filter 117 is effective for removing the folding disturbance components which still remains in the low frequency region of the one-interframe signal. By supplying a threshold value corresponding to the S/N ratio of the signal, the noise components of small amplitude can be removed from the low frequency components of the one-interframe differential signal. Thus it can be ascertained whether or not the effective motion information exists in the low frequency components of the one-interframe signal.

Further, the provision of the second area filter 120 is effective for removing the folding disturbance components which still remains in the high frequency region of the one-interframe signal. By supplying a threshold value corresponding to the S/N ratio of the signal, the noise components of small amplitude can be removed from the high frequency components of the one-interframe differential signal. Thus it can be ascertained whether or not the effective motion information exists in the high frequency components of the one-interframe signal.

Further, since the fourth horizontal filter 132 removes the folding disturbance components of low vertical frequency in the neighborhood of horizontal frequency 16.2 MHz of the output signal of the second vertical filter 45, the interfield motion information without adverse effects of the folding disturbance components near the horizontal frequency 16.2 MHz can be obtained.

Furthermore, due to the provision of the second divider 140 and the second AND circuit 143 the output signal of which is a signal representing whether or not the present data is in the motion region of the picture, the existence or non-existence of the motion information in the predetermined frequency range of the high frequency component of the one-interfield differential signal can be obtained by a simple and small-sized circuit.

Further, the provision of the third area filter 138 is effective for removing the folding disturbance components which still remains in the low frequency region of the one-interfield signal. By supplying a threshold value corresponding to the S/N ratio of the signal, the noise components of small amplitude can be removed from the low frequency components of the one-interfield differential signal. Thus it can be ascertained whether or not the effective motion information exists in the low frequency components of the one-interfield signal.

Further, the provision of the fourth area filter 141 is effective for removing the folding disturbance components which still remains in the high frequency region of the one-interfield signal. By supplying a threshold value corresponding to the S/N ratio of the signal, the noise components of small amplitude can be removed from the high frequency components of the one-interfield differential signal. Thus it can be ascertained whether or not the effective motion information exists in the high frequency components of the one-interfield signal.

What is claimed is:

1. A motion detection circuit in a MUSE decoder for reproducing a high definition television picture signal from a MUSE signals, comprising:

a vertical filter for obtaining one-interframe differential signal from an interframe interpolation signal, the interframe interpolation signal being determined solely from present field transmitted data and data transmitted one frame earlier interpolated therein, said vertical filter attenuating frequency components in a neighborhood of a vertical frequency 1125/4 cycles/height (c/h) in a slantwise direction; and a horizontal filter for separating an output signal of said vertical filter into a high frequency component signal above a predetermined horizontal frequency and a low frequency component signal below said predetermined horizontal frequency.

2. A motion detection circuit in a MUSE decoder for reproducing a high definition television picture signal from a MUSE signal, comprising:

a two-dimensional filter including a vertical filter means for obtaining one-interframe differential signal from an interframe interpolation signal, the interframe interpolation signal being determined solely from present field transmitted data and data transmitted one frame earlier interpolated therein, said vertical filter means attenuating frequency components in a neighborhood of a predetermined vertical frequency in a slantwise direction, and a horizontal filter means for separating an output signal of said vertical filter means into a high frequency component signal above a predetermined horizontal frequency and a low frequency component signal below said predetermined horizontal frequency;

first peak detector means coupled to said horizontal filter means for obtaining and outputting a peak value of said low frequency component signal below said predetermined horizontal frequency;

horizontal width extender means, coupled to said first peak detector means and said horizontal filter means, for holding said peak value output from said first peak detector means for a tap length of said horizontal filter means, said horizontal width extender means outputting a peak value nearest to a current level of said low frequency component signal below said predetermined horizontal frequency; and non-linear circuit means coupled to said horizontal filter means, for effecting a non-linear conversion to said low frequency component signal below said predetermined horizontal frequency, thereby effecting an adjustment for an attenuation of high frequency components in said low frequency component signal.

3. A motion detection circuit as claimed in claim 2, further comprising:

first area filter means, operatively connected to said horizontal filter means, for determining valid and invalid regions of said high frequency component signal above said predetermined horizontal frequency, said first area filter means clipping said high frequency component signal above said predetermined horizontal frequency in response to a level of said low frequency component signal below said predetermined horizontal frequency;

second peak detector means coupled to said first area filter means, for obtaining and outputting a peak value of an output signal of said first area filter means; an comparator means, operatively connected to said horizontal filter means and said first area filter means, for comparing levels of said frequency component signal below said predetermined horizontal frequency.

4. A motion detection ,circuit as claim in claim 3, further comprising:

judgment/selector means, operatively connected to said first peak detector means, said second peak detector means, said horizontal filter means, said comparator means, said horizontal width extender means, and said non-linear circuit means, said judgement/selector means for selecting one signal from said low frequency component signal below said predetermined horizontal frequency outputted from said horizontal filter means and output signals of said horizontal width extender means and said non-linear circuit means, on the basis or correlation among output signals of said first peak detector means, said second peak detector means, and said comparator means; and second area filter means coupled to said two-dimensional filter means and said judgement/selector means, for selecting one from output signals of said two-dimensional filter means and said judgment/selector means in response to a level of the output signal of said two-dimensional filter means.

5. A motion detection circuit as claimed in claim 4, further comprising:

edge detector circuit means for extracting edge components of the transmitted data of present field from a present data input signal;

sensitivity converter circuit means coupled to said edge detector circuit means and said second area filter means, for effecting non-linear conversion to an output signal of said second area filter through use of an output signal of said edge detector circuit thereby normalizing a sensitivity of said output signal of said second area filter; and isolated points remover circuit means coupled to said sensitivity converter circuit means, for removing noise components having no correlation with neighboring data from an output signal of said sensitivity converter circuit means on the basis of a horizontal and vertical correlation judgement.

6. A motion detection circuit in MUSE decoder for reproducing a high definition television picture signal from a MUSE signal comprising:

interpolator means, receiving current field transmission data for interpolating data transmitted one frame earlier into said current field transmission data;

first field memory means, operatively connected to said interpolator means, for delaying an output signal of said interpolator means by 560 horizontal scanning periods;

second field memory means, operatively connected to said first field memory means, for delaying an output signal of said first field memory by 565 horizontal scanning periods, said second field memory means effecting vertical motion correction to the output signal of said first field memory in response to a vertical motion vector;

first horizontal motion corrector means operatively connected to said second field memory means, for effecting first horizontal motion correction to an output signal of said second field memory in response to horizontal motion vector; and second horizontal motion corrector means, operatively connected to said first field memory means, for effecting second horizontal motion correction to the output signal of said first field memory in response to a horizontal motion vector.

7. A motion detection circuit as claimed in claim 6, further comprising:

two line (2-H) delay circuit means, operatively connected to said second horizontal motion corrector means, for delaying said output signal of said second horizontal motion corrector by two horizontal scanning periods;

one line (1-H) delay circuit means, operatively connected to said 2-H delay circuit means, for delaying said output signal of said 2-H delay circuit by one horizontal scanning period; and one-field differential extractor means, operatively connected to said interpolator means, said 2-H delay circuit means, and said 1-H delay circuit means, said one-field differential extractor means obtaining and outputting a one-interfield differential or a one-frame sum of one-interfield differentials.

8. A motion detection circuit as claim in claim 7, further comprising:

first two-dimensional filter means, operatively connected to said one-field differential extractor mean, for attenuating frequency components of an output signal of said one-field differential extractor near vertical frequency 1125/4 cycles/height (c/h) in a slantwise direction.

9. A motion detection circuit as claimed in claim 8, further comprising:

horizontal filter means for separating an output signal of said first two-dimensional filter into a high frequency component signal above said predetermined horizontal frequency and a low frequency component signal below said predetermined horizontal frequency.

10. A motion detection circuit as claimed in claim 9, further comprising:

first peak detector means, operatively connected to said horizontal filter means for obtaining and outputting a peak value of said low frequency component signal below said predetermined horizontal frequency; and horizontal width extender means, coupled to said first peak detector means and said second horizontal filter means, for holding said peak value output from said first peak detector means for a tap length of said second horizontal filter means, said horizontal width extender means outputting a peak value nearest to a current level of said low frequency component signal below said predetermined horizontal frequency.

11. A motion detection circuit in claim 10, further comprising:

first area filter means coupled to said horizontal filter means, for determining valid and invalid regions of said high frequency component signal above said predetermined horizontal frequency, said first area filter means clipping said high frequency component signal above said predetermined horizontal frequency in response to a level of said low frequency component signal below said predetermined horizontal frequency;

second peak detector means coupled to said first area filter means, for obtaining and outputting a peak value of an output signal of said first area filter means; and comparator means coupled to said horizontal filter means and said first area filter means for comparing levels of said output signal of said first area filter means and said low frequency component signal below said predetermined horizontal frequency.

12. A motion detection circuit as claimed in claim 11 further comprising:

judgement/selection circuit means for selecting an output signal of said horizontal filter means in response to output signals of said first peak detector means, said second peak detector means, and said comparator means, said judgement/selection means selecting an output signal of said horizontal filter means when the output signal of said horizontal filter means is less than or equal to an output signal of said first area filter means and, in addition, said first peak detector and said second peak detector do not output peak detection signals simultaneously.

13. A motion detection circuit as claimed in claim 12, further comprising:

edge detector circuit means for extracting edge components of the transmitted data of a present field from the present data input signal; and sensitivity converter circuit means operatively connection to said edge detector circuit means and said selector means, for effecting non-linear conversion to an output signal of said selector by means of an output signal of said edge detector circuit thereby normalizing a sensitivity of said output signal of said selector means.

14. The motion detection circuit of claim 12 wherein said judgement/selection circuit means further selects an output signal of said two dimensional filter means in response to output signals of said first peak detector means, said second peak detector means, and said comparator means, said judgement/selection means selecting an output signal of said two-dimensional filter means when said low frequency component signal of said horizontal filter means is less than or equal to an output signal of said first area filter means and, in addition, said first peak detector and said second peak detector output peak detection signals simultaneously.

15. A motion detection circuit as claimed in claim 11, further comprising:

judgement/selection circuit means for selecting an output signal of said two-dimensional filter means in response to output signals of said first peak detector means, said second peak detector means, and said comparator means, said judgement/selection means selecting an output signal of said two-dimensional filter means when said low frequency component signal of said horizontal filter means is less than or equal to an output signal of said first area filter means and, in addition, said first peak detector and said second peak detector output peak detection signals simultaneously.

16. A motion detection circuit as claimed in claim 11 further comprising:

judgement/selection circuit means for selecting an output signal of said horizontal width extender means in response to an output signal of said comparator means when an output signal of said horizontal filter is greater than an output signal of said first area filter means.

17. The motion detection circuit of claim 16 wherein said judgement/selection circuit means further selects an output of said horizontal filter means in response to output signals of said first peak detector means, said second peak detector means, and said comparator means, said judgement/selection means selecting an output signal of said horizontal filter means when the output signal of said horizontal filter means is less than or equal to an output signal of said first area filter means an, in addition, said first peak detector and sags second peak detector do not output peak detection signals simultaneously.

18. The motion detection circuit of claim 17 wherein said judgement/selection circuit means further selects an output signal of said two dimensional filter means in response to output signals of said first peak detector means, said second peak detector means, and said comparator means, said judgement/selection means selecting an output signal of said two-dimensional filter means when said low frequency component signal of said horizontal filter means is less than or equal to an output signal of said first area filter means and, in addition, said first peak detector and said second peak detector output peak detection signals simultaneously.

19. A motion circuit as claimed in claim 18, said judgement/selection circuit means producing a selection signal representative of its selection.

20. A motion detection circuit as claimed in claim 19, further comprising:

second area filter means coupled to said judgement/selection circuit means, said judgement/selection circuit means causing said second area filter means to output the output signal of said first two-dimensional filter when said selection signal is greater than an output signal of said first two-dimensional filter, and to output said selection signal when said selection signal is less than or equal to said output signal of said first two-dimensional filter.

21. A motion detection circuit as claimed in claim 20, further comprising:

horizontal extender means coupled to said second area filter means, for taking at least three sample values of output signal of said second area filter means in a horizontal direction, said horizontal extender means selecting a peak value among said three sample values; and vertical extender means coupled to said horizontal extender means, for taking at least three sample values of the output signal of said horizontal extender means in a vertical direction, said vertical extender means selecting a peak value among said three values.

22. A motion detection circuit as claimed in claim 21, further comprising:

isolated points remover means coupled to said vertical extender means, for removing noise components having no correlation with neighboring data from an output signal of said vertical extender means on the basis of horizontal and vertical correlation judgement.

23. A motion detection circuit as claimed in claim 22, further comprising:

second two-dimensional filter coupled to said interpolator means, for determining one-interframe differential and then attenuating frequency components above said predetermined horizontal frequency and near the vertical frequency 1125/4 (c/h) in a slantwise direction; and selector means for selecting one signal from the output signals of said second two-dimensional filter and said isolated points remover means.

24. A motion detection circuit in MUSE decoder for reproducing a high definition television picture signal from a MUSE signal, comprising:

one-interframe differential calculator means coupled to an input terminal receiving an interframe interpolation signal consisting of present transmitted data and data transmitted one frame earlier interpolated therein, said one-interframe differential calculator means calculating one-interframe differential signal from said interframe interpolation signal;

horizontal filter means coupled to said one-interframe differential calculator means, for extracting a low frequency component signal of said one-interframe differential signal output from said one-interframe differential calculator means;

two-value signal generator means coupled to said one-interframe differential calculator means, for converting said one-interframe differential signal into a two-value signal on the basis of a predetermined threshold level;

frame memory means coupled to said two-value signal generator means, for delaying said two-value signal by one frame;

switcher circuit means having an input receiving two-interframe differential signal obtained by subtracting a signal transmitted two frames earlier from the present transmitted signal, said switcher circuit means having another input terminal coupled to an output of said frame memory means, said switcher circuit means limiting two-dimensional picture region of said two-interframe differential signal by means of the output signal of said frame memory means;

wherein said motion detection circuit provides motion detection information contained in said low frequency component signal output from said horizontal filter means and the two-interframe differential signal output from said switcher circuit means.

25. A motion detection circuit as claimed in claim 24, further comprising:

horizontal width extender means disposed intermediate said two-value signal generator means and said frame memory means, for extending said two-value signal output from said two-value signal generator means in a horizontal direction.

26. A motion detection circuit as claimed in claim 25, further comprising:

inverter means coupled to an output of said horizontal width extender means, for inverting a polarity of the output signal of said horizontal width extender;

wherein said switcher circuit means is coupled to an output of said inverter means, said switcher circuit means limiting the two-dimensional picture region of said two-interframe differential signal by means of an the output signal of said inverter means.

27. A motion detection circuit as claimed in claim 26, further comprising:

an OR gate means having inputs coupled to said frame memory means and said inverter means, for generating a logical sum of output signals of said frame memory means and said inverter means, wherein an output of said OR gate means is coupled to said switcher circuit means, and said switcher circuit means limits the two-dimensional picture region of said two-interframe differential signal in response to the output signal of said OR gate means.

28. A motion detection circuit in MUSE decoder for reproducing a high definition television picture comprising:

interpolator means having an input terminal receiving current field transmission data, for interpolating data transmitted one frame earlier into a current field transmission;

interframe differential signal extractor means coupled to said interpolator means, for extracting one-interframe differential signal from an output signal of said interpolator means;

interfield differential signal extractor means coupled to said interpolator means, for extracting one-interfield differential signal from an output signal of said interpolator means;

first two-dimensional filter means coupled to said interframe differential signal extractor means, for attenuating frequency components of said one-interframe differential signal near vertical frequency 1125/4 cycles/height (c/h) in a slantwise direction;

second two-dimensional filter means coupled to said interfield differential signal extractor means, for attenuating frequency components of said one-interfield differential signal near the vertical frequency 1125/4 (c/h) in the slantwise direction;

first horizontal filter means coupled to said first two-dimensional filter means, for separating an output signal of said first two-dimensional filter means into a high frequency component signal and a low frequency component signal;

second horizontal filter means coupled to said second two-dimensional filter means, for separating an output signal of said second two-dimensional filter means into a high frequency component signal and a low frequency component signal;

first edge improver means coupled to said first horizontal filter means, for improving edge portions of said low frequency component signal output from said first horizontal filter means;

second edge improver means coupled to said second horizontal filter means, for improving edge portions of said low frequency component signal output from said second horizontal filter means;

first folding disturbance component remover means coupled to said first horizontal filter means, for removing folding disturbance components for still picture processing from said high frequency component signal output from said first filter means;

second folding disturbance component remover means coupled to said second horizontal filter means, for removing folding disturbance components for still picture processing from said high frequency component signal output from said second filter means;

first selector means coupled to said first edge improver means and said first folding disturbance component remover means, for selecting and reproducing one-interframe differential signal;

second selector means coupled to said second edge improver means and said first folding disturbance component remover means, for selecting and reproducing one-interfield differential signal;

horizontal extender means coupled to said second selector means, for obtaining a peak value among adjacent data in horizontal direction, thereby compensating for motion information drop caused by subsampling in accordance with MUSE system;

vertical extender means coupled to said horizontal extender means, for obtaining a peak value among adjacent data in vertical direction, thereby compensating for motion information drop caused by subsampling in accordance with MUSE system; and third selector means coupled to said first selector means and said vertical extender means, for obtaining motion information in accordance with output signals of said first selector means and said vertical extender means.

29. A motion detection circuit as claimed in claim 28, wherein said second horizontal filter means includes:

fourth horizontal filter means having an input coupled to said second two-dimensional filter means, said fourth horizontal filter means removing folding disturbance components of low vertical frequency near horizontal frequency 16.2 MHz.

30. A motion detection circuit as claimed in claim 29, wherein said second folding disturbance component remover means includes:

third absolute value output circuit means coupled to said second horizontal filter means, for outputting an absolute value of said low frequency component signal output from said second horizontal filter means;

second subtractor means coupled to said second horizontal filter means, for outputting a differential signal of said low frequency component outputted from said second horizontal filter means and an output of said fourth horizontal filter means;

fourth absolute value output circuit means coupled to said second subtractor means, for outputting an absolute value of an output signal of said second subtractor means;

a fourth area filter means having an input coupled to an output of said fourth ablsoute value output circuit means, wherein said fourth area filter means compares and output signal of said fourth absolute value output circuit with a threshold level, said fourth area filter means outputting a two-value signal corresponding to a result of comparison;

second divider means coupled to said third absolute value output circuit means and said fourth absolute value output circuit means, for dividing an absolute value output from said fourth absolute value output circuit by an absolute value output from said third absolute value output circuit;

wherein said second folding disturbance component remover means judges on the basis of a level of an output signal of said second divider means whether or not said one-interfield signal is within predetermined frequency range.

31. A motion detection circuit as claimed in claim 28, wherein said first horizontal filter means includes:

third horizontal filter means having an input coupled to said first two-dimensional filter means, said third horizontal filter means removing folding disturbance components of low vertical frequency near horizontal frequency 16.2 MHz.

32. A motion detection circuit as claimed in claim 31, wherein said first folding disturbance component remover means includes:

first absolute value output circuit means coupled to said first horizontal filter means, for outputting an absolute value of said low frequency component signal output from said first horizontal filter means;

first subtractor means coupled to said first horizontal filter means, for outputting a differential signal of said low frequency component outputted from said first horizontal filter means and an output signal of said third horizontal filter means;

second absolute value output circuit means coupled to said first subtractor means, for outputting an absolute value of an output signal of said first subtractor means; and first divider means coupled to said first absolute value output circuit means and said second absolute value output circuit means, for dividing an the absolute value output from said second absolute value output circuit by an absolute value output from said first absolute value output circuit;

wherein said first folding disturbance component remover means judges on the basis of a level of an output signal of said first divider means whether or not said one-interframe signal is within predetermined frequency range.

33. A motion detection circuit as claimed in claim 28, further including a first area filter means disposed intermediate said first edge improver means and said first selector means, said first area filter means having an input coupled to said first edge improver means, wherein said first area filter means compares an output signal of said first edge improver with a threshold level, said first area filter means outputting a two-value signal corresponding to a result of comparison.

34. A motion detection circuit as claimed in claim 28, further including a second area filter means having an input coupled to one of said first subtractor means and an output of said second absolute value output circuit means, wherein said second area filter means compares an output signal of said one of said first subtractor means and said second absolute value output circuit with a threshold level, said second area filter means outputting a two-value signal corresponding to a result of comparison.

35. A motion detection circuit as claimed in claim 28, further including a third area filter means inserted between said second edge improver means and said second selector means, said third area filter means having an input coupled to said second edge improver means, wherein said third area filter means compares an output signal of said second edge improver with a threshold level, third area filter means outputting a two-value signal corresponding to a result of comparison.

36. A motion detection circuit as claimed in claim 28, further comprising:

edge detector circuit means for extracting edge components of transmitted data of present field from a present data input signal; and sensitivity converter circuit means coupled to said edge detector circuit means and said third selector means, for effecting non-linear conversion to an output signal of said third selector by means of an output signal of said edge detector circuit thereby normalizing a sensitivity of said output signal of said third selector.

37. A motion detection circuit as claimed in claim 36, further comprising:

isolated points remover circuit means coupled to said sensitivity converter circuit means, for removing noise components having no correlation with neighboring data from an output signal of said sensitivity converter circuit means on the basis of a horizontal and vertical correlation judgement.

38. A method of motion detection in a MUSE (multiple sub-Nyquist encodation) decoder comprising:

a) detecting edges in present video signal frame information and producing an edge information signal;

b) receiving interleaved present and previous video signal frame information as an interfield signal;

c) obtaining a differential motion signal from the interfield signal;

d) filtering the differential motion signal to remove high frequencies in a frequency range where folding disturbance signals may exist to produce a filtered differential motion signal;

e) selectively adding high frequency information in the frequency range where folding disturbance components exist to the filtered differential motion signal only when the high frequency information is not due to folding disturbances in the video signal to produce a high frequency enhanced motion signal to enhance the reproduction of moving images; and f) adjusting sensitivity of said high frequency enhanced motion signal in the area of image edges in response to said edge information signal to produce motion detection data.

39. The method of claim 38 wherein said interfield signal received in said step b) is an interframe signal.

40. The method of claim 39 wherein said differential motion signal is an interframe differential motion signal.

41. The method of claim 39 wherein said step c) and d) are performed by two-dimensionally filtering said interframe signal.

42. The method of claim 38 further comprising g) removing isolated points from said motion detection data to remove residual noise therefrom.

43. The method of claim 38 wherein said differential motion signal is an interfield differential motion signal.

* * * * *